(12) United States Patent
Nakayama

(10) Patent No.: US 7,045,044 B2
(45) Date of Patent: May 16, 2006

(54) DISPERSION COMPOSITION CONTAINING PERFLUOROCARBON-BASED COPOLYMER

(75) Inventor: Yoshimichi Nakayama, Nobeoka (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 499 days.

(21) Appl. No.: 10/381,473

(22) PCT Filed: Sep. 27, 2001

(86) PCT No.: PCT/JP01/08443

§ 371 (c)(1),
(2), (4) Date: Mar. 26, 2003

(87) PCT Pub. No.: WO02/26883

PCT Pub. Date: Apr. 4, 2002

(65) Prior Publication Data

US 2004/0099527 A1    May 27, 2004

(30) Foreign Application Priority Data

Sep. 27, 2000  (JP) ............................. 2000-293884

(51) Int. Cl.
*C25B 13/08* (2006.01)

(52) U.S. Cl. .................... 204/296; 427/385.5; 428/422; 429/33; 521/27

(58) Field of Classification Search ................ 204/296; 427/385.5; 428/422; 429/33; 521/27
See application file for complete search history.

(56) References Cited

U.S. PATENT DOCUMENTS

| | | | |
|---|---|---|---|
| 4,298,697 A | * | 11/1981 | Baczek et al. ................. 521/27 |
| 4,552,631 A | * | 11/1985 | Bissot et al. ................. 205/521 |
| 4,650,551 A | * | 3/1987 | Carl et al. ................... 205/516 |
| 5,087,345 A | * | 2/1992 | Kashiwada et al. ......... 204/295 |
| 5,290,846 A | * | 3/1994 | Tuminello ................... 524/463 |
| 5,547,551 A | | 8/1996 | Bahar et al. |
| 5,580,654 A | * | 12/1996 | Cotter et al. ................. 428/375 |
| 6,054,230 A | * | 4/2000 | Kato ............................ 429/33 |
| 6,130,175 A | | 10/2000 | Rusch et al. |
| 6,156,451 A | | 12/2000 | Banerjee et al. |

FOREIGN PATENT DOCUMENTS

| | | |
|---|---|---|
| EP | 0 718 903 A1 | 6/1996 |
| JP | 48-13333 | 4/1973 |
| JP | 58-37185 A | 3/1983 |
| JP | 58-500567 A | 4/1983 |
| JP | 59-219487 A | 12/1984 |
| JP | 60-44333 A | 3/1985 |
| JP | 60-219232 A | 11/1985 |
| JP | 61-15897 B2 | 4/1986 |
| JP | 62-501079 A | 4/1987 |
| JP | 62-59190 B2 | 12/1987 |
| JP | 2-10177 B2 | 3/1990 |
| JP | 2-19848 B2 | 5/1990 |
| JP | 3-137136 A | 6/1991 |
| JP | 6-192431 A | 7/1994 |
| JP | 7-103251 A | 4/1995 |
| JP | 8-162132 A | 6/1996 |
| JP | 8-329962 A | 12/1996 |
| JP | 10-72775 A | 3/1998 |
| WO | WO 82/03868 A1 | 11/1982 |

* cited by examiner

*Primary Examiner*—Roy King
*Assistant Examiner*—W. T. Leader
(74) *Attorney, Agent, or Firm*—Birch Stewart Kolasch & Birch LLP

(57) ABSTRACT

A dispersion composition comprising 100 parts by weight of a specific perfluorocarbon-based copolymer containing functional groups and 10 to 10,000 parts by weight of a specific liquid fluoro-oligomer(s). The composition of the present invention is useful as a material for producing, for example, a fluorine-containing cation-exchange membrane having excellent functions imparted thereto.

8 Claims, No Drawings

DISPERSION COMPOSITION CONTAINING PERFLUOROCARBON-BASED COPOLYMER

This application is the national phase under 35 U.S.C. § 371 of PCT International Application No. PCT/JP01/08443 which has an International filing date of Sep. 27, 2001, which designated the United States of America.

TECHNICAL FIELD

The present invention relates to a dispersion composition comprising a perfluorocarbon-based copolymer containing nonelectrolyte type functional groups and a liquid fluoro-oligomer(s) which is useful as a material for producing a fluorine-containing cation-exchange membrane (a diaphragm for electrolysis or a diaphragm for a fuel cell), a gaseous-diffusion electrode or a membrane-electrodes assembly; a process for producing the dispersion composition; a diaphragm for electrolysis, a diaphragm for a fuel cell and a membrane-electrodes assembly which are produced by using the dispersion composition as a starting material and which are excellent in technical functions.; and a process for the production thereof.

BACKGROUND ART

Fluorine-containing cation-exchange membranes are commonly used as a diaphragm for sodium chloride electrolysis, a diaphragm for fuel cells, etc. In order to impart new functions to the membrane, there are known a technique for forming a coating layer containing solid particles (e.g. an electrode powder or alkali-resistant inorganic material particles) and a cation-exchange resin as dispersoids, and a technique for forming a multilayer membrane composed of a large number of layers.

As to a technique for producing a dispersion consisting of a perfluorocarbon-based copolymer, another resin, solid particles and the like, there are known processes comprising melt kneading and melt shaping (see, for example, JP-B-60-44333, JP-A-60-219232 and JP-B-2-19848). According to any of these processes, it is difficult to form a thin layer necessary for imparting excellent functions, on a membrane used as a substrate.

As a technique for forming a thin layer containing solid particles dispersed therein or a technique for forming a multilayer membrane composed of a large number of layers, there is known a technique using a solution or dispersion of a perfluorocarbon-based copolymer as a starting material for the thin layer or the multilayer membrane.

As to a technique using a solution of perfluoro-carbon-based copolymer containing electrolyte type ($SO_3H$ type, $SO_3Na$ type or the like) functional groups (see, for example, JP-B-48-13333 as to a technique for forming the solution) as a starting material, there are known, for instance, processes for forming a layer of inorganic material particles or electrode powder on a membrane and processes for forming a membrane by impregnating a tetrafluoroethylene stretched porous film with the solution (see, for example, JP-A-59-219487, JP-A-3-137136, JP-A-8-162132, JP-A-8-329962, JP-B-7-103251, U.S. Pat. Nos. 5,547,551, 6,130,175 and 6,156,451). In these processes, since the starting solution is prepared from a perfluorocarbon-based copolymer containing electrolyte type ($SO_3H$ type or the like) functional groups, it is difficult to impart a sufficient adhesive strength between resin portions of the perfluorocarbon-based copolymer containing the functional groups. In addition, since the resin structure is changed by a high-temperature history imposed during the preparation of the polymer solution, the structural stability at the time of undergoing swelling and shrinkage and the long-term structural stability and performance stability are low. Moreover, it is difficult to form a multilayer membrane having a high peel resistance on the joint interface between different copolymers or between a copolymer and a substrate. U.S. Pat. No. 6,130,175 discloses that a porous material can be impregnated with a nonelectrolyte type ($CO_2CH_3$ type) copolymer, but this technique does not permit sufficient impregnation with a copolymer having a sufficiently high molecular weight which is useful for practical purposes, and merely permits formation of a two-layer structure in which an anchor effect has been imparted to a part of the boundary surface between a porous material and the copolymer, as described, for example, in U.S. Pat. No. 6,156,451.

There has also been disclosed a technique for forming a solution or dispersion of a perfluorocarbon-based copolymer containing nonelectrolyte type functional groups.

There is known, for example, a method in which functional groups are converted to ester type functional groups having a long-chain hydrocarbon-type alkoxy group, such as $CO_2C_{10}H_{21}$ (see JP-B-61-15897). However, according to this method, sufficient melting and strong adhesion to a membrane used as a substrate are difficult because the ester type functional groups ($CO_2C_{10}H_{21}$ type or the like) have such a low thermal stability that the thermal decomposition of said functional groups occurs at a temperature higher than 150 to 180° C.

There is also known a method using a dispersion of a perfluorocarbon-based copolymer containing $CO_2CH_3$ type functional groups which is produced from a latex obtained by polymerization in an aqueous medium (see, for example, JP-B-62-59190). However, according to this method, strong bonding among polymer particles and between polymer particles and a substrate membrane by fusion is difficult, for example, because a surfactant remains on the surfaces of polymer particles with a particle size of about 1 μm or less made of the perfluorocarbon-based copolymer. A method is also known in which a solvent in the same latex as above is replaced (see, for example, JP-B-2-10177). However, according to this method, it is difficult to obtain a homogeneous dispersion because the union or aggregation of polymer particles of a perfluorocarbon-based copolymer containing functional groups occurs easily during the replacement of the solvent, so that an inhomogeneous dispersion tends to be formed.

There is also known a technique for producing a solution of a perfluorocarbon-based copolymer having $CO_2CH_3$- or $SO_2F$-type nonelectrolyte-type functional groups (see, for example, JP-A-6-192431). However, in this technique, the physical properties of the functional-group-containing perfluorocarbon-based copolymer that is soluble are limited. Therefore, it is difficult to obtain a solution of a functional-group-containing perfluorocarbon-based copolymer having high EW (equivalent weight) value and molecular weight which is useful for practical purposes, and it is also difficult to produce a polymer solution containing a high concentration of a copolymer which is useful for practical purposes.

A polymer solution technique using a fluoro-oligomer as a solvent is also known (see Japanese Patent Application Kohyo No.58-500567). However, this technique does not permit formation of a polymer solution of a copolymer having a sufficiently high molecular weight which is useful for practical purposes.

DISCLOSURE OF THE INVENTION

The present invention solves such problems and is intended to provide a starting material containing a perfluorocarbon-based copolymer having nonelectrolyte type functional-groups which is useful for coating with a dispersion layer containing solid particles (e.g. electrode powder or alkali-resistant inorganic material particles) dispersed therein or for forming a multilayer membrane composed of a large number of layers; a process for producing said starting material; a fluorine-containing cation-exchange membrane (a diaphragm for electrolysis or a diaphragm for a fuel cell) or a membrane-electrodes assembly which is obtained by using said starting material and which are excellent in technical functions; and a process for the production thereof.

The present inventor earnestly investigated in order to solve the above problems, and consequently found that the following dispersion composition can be formed as a material for producing a useful membrane which can be substituted for a solution of a perfluorocarbon-based copolymer containing nonelectrolyte type functional groups: a dispersion composition in which a perfluorocarbon-based copolymer containing nonelectrolyte type functional groups which is inhibited from forming a completely solid structure (a crystalline structure or the like) therein and a fluoro-oligomer(s) are finely dispersed; and that said dispersion composition is suitable for the above object. On the basis of this finding, the present invention has been accomplished.

That is, the present invention relates to:

(1) a dispersion composition comprising 100 parts by weight of a perfluoro-copolymer having repeating units represented by the following formula 1 and 10 to 10,000 parts by weight of at least one fluoro-oligomer selected from liquid fluoroolefin telomers having repeating units shown in the following formula 2 or liquid fluoro-oligoethers having repeating units shown in the following formula 3:

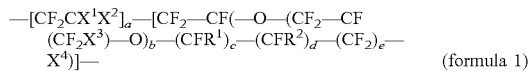
(formula 1)

wherein $X^1$, $X^2$ and $X^3$ are independently F or Cl, a is a real number of 2 to 20, b is an integer of 0 to 2, c is 0 or 1, d and e are independently an integer of 0 to 6, provided that c+d+e is not equal to 0, $R^1$ and $R^2$ are independently F, Cl or a perfluoroalkyl or fluorochloroalkyl group of 1 to 10 carbon atoms, $X^4$ is $CO_2R^3$ or $SO_2F$, and $R^3$ is a hydrocarbon type alkyl group of 1 to 3 carbon atoms;

$$—(CF_2—CFY)_s— \quad \text{(formula 2)}$$

wherein Y is F or Cl, and s is a real number of 6 to 10; and

(formula 3)

wherein $R_f^1$ and $R_f^2$ are independently a perfluoroalkylene group of 1 to 4 carbon atoms, and each of q and r is such a real number that q+r is 6 to 100, (2) a dispersion composition according to (1), wherein the perfluoro-copolymer is that having repeating units represented by the following formula 4 and the fluoro-oligomer(s) is a fluoro-oligoether(s) having repeating units shown in the following formula 5, formula 6 or formula 7:

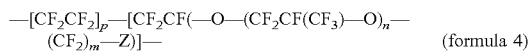
(formula 4)

wherein n is an integer of 0 to 2, m is an integer of 2 to 4, p is a real number of 2 to 20, and Z is $CO_2CH_3$ or $SO_2F$;

(formula 5)

wherein each of q and r is such a real number that q+r is 6 to 100;

(formula 6)

wherein each of q and r is such a real number that q+r is 6 to 100; and

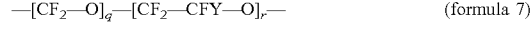
(formula 7)

wherein each of q and r is such a real number that q+r is 6 to 100, and Y is F or $CF_3$, (3) a dispersion composition according to (2), which comprises 100 parts by weight of the perfluoro-copolymer and 200 to 10,000 parts by weight of the fluoro-oligoether(s), the perfluoro-copolymer being dispersed in the fluoro-oligoether(s), (4) a dispersion composition according to (3), wherein the average particle size of the perfluoro-copolymer is 100 μm or less, (5) a process for forming a perfluoro-copolymer layer containing solid particles dispersed therein on a substrate membrane which comprises:

(i) mixing and kneading 10 to 1000 parts by weight of one or more kinds of solid particles selected from at least one group among three groups, i.e., a group of alkali-resistant inorganic material particles, a group of electrode powders and a group of sacrificial particles, with a dispersion composition comprising 100 parts by weight of a perfluoro-copolymer having repeating units represented by the following formula 1 and 10 to 10,000 parts by weight of at least one fluoro-oligomer having repeating units shown in the following formula 2 or formula 3, to form a pasty or powdery dispersion composition:

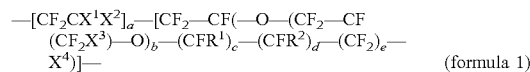
(formula 1)

wherein $X^1$, $X^2$ and $X^3$ are independently F or Cl, a is a real number of 2 to 20, b is an integer of 0 to 2, c is 0 or 1, d and e are independently an integer of 0 to 6, provided that c+d+e is not equal to 0, $R^1$ and $R^2$ are independently F, Cl or a perfluoroalkyl or fluorochloroalkyl group of 1 to 10 carbon atoms, $X^4$ is $CO_2R^3$ or $SO_2F$, and $R^3$ is a hydrocarbon type alkyl group of 1 to 3 carbon atoms;

$$—(CF_2—CFY)_s— \quad \text{(formula 2)}$$

wherein Y is F or Cl, and s is a real number of 6 to 10; and

(formula 3)

wherein $R_f^1$ and $R_f^2$ are independently a perfluoroalkylene group of 1 to 4 carbon atoms, and each of q and r is such a real number that q+r is 6 to 100, (ii) removing the fluoro-oligomer(s) from said dispersion composition by extraction with a fluorine-containing solvent to form a powdery solid-particle-dispersion composition containing the perfluoro-copolymer and the solid particles as dispersoids, and (iii) fixing said solid-particle-dispersion composition on the surface of a substrate membrane by heating at 160° C. to 340° C., (6) a membrane having a perfluoro-copolymer layer containing solid particles dispersed therein which is obtained by adopting a process according to (5), (7) a diaphragm for electrolysis, a diaphragm for a fuel cell, or a membrane-electrodes assembly, which comprises a membrane according to (6), (8) a process for forming a perfluoro-copolymer layer containing solid particles dispersed therein on a substrate membrane which comprises:

(i) mixing and kneading 10 to 1000 parts by weight of one or two kinds of solid particles selected from at least one group among three groups, i.e., a group of alkali-resistant inorganic material particles, a group of electrode powders and a group of sacrificial particles, with a dispersion composition comprising 100 parts by weight of a perfluoro-copolymer having repeating units represented by the following formula 4 and 200 to 10,000 parts by weight of at least one fluoro-oligomer having repeating units shown in the following formula 5, formula 6 or formula 7, to form a pasty solid-particle dispersion composition:

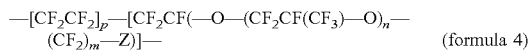  (formula 4)

wherein n is an integer of 0 to 2, m is an integer of 2 to 4, p is a real number of 2 to 20, and Z is $CO_2CH_3$ or $SO_2F$;

  (formula 5)

wherein each of q and r is such a real number that q+r is 6 to 100;

  (formula 6)

wherein each of q and r is such a real number that q+r is 6 to 100; and

  (formula 7)

wherein each of q and r is such a real number that q+r is 6 to 100, and Y is F or $CF_3$, (ii) applying said solid-particle dispersion composition on the surface of a substrate membrane and heating the composition at 160 to 340° C. to fix the same, and then (iii) washing away the fluoro-oligoether(s) from said film with a fluorine-containing solvent, (9) a process according to (8), wherein Z in formula 4 is $CO_2CH_3$, and the substrate membrane is a diaphragm for electrolysis,

(10) a membrane having a perfluoro-copolymer layer containing solid particles dispersed therein which is obtained by a process according to (8),

(11) a diaphragm for electrolysis, a diaphragm for a fuel cell, or a membrane-electrodes assembly, which comprises a membrane according to (10),

(12) a diaphragm for electrolysis obtained by a process according to (9),

(13) an impregnated film obtained by impregnating a polytetrafluoroethylene stretched porous film with a perfluoro-copolymer having repeating units represented by the above formula 1 or formula 4,

(14) an impregnated film according to (13), wherein the copolymer is a perfluoro-copolymer containing $SO_3H$ type functional groups and having repeating units represented by the following formula 8:

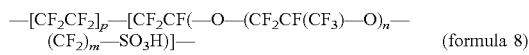  (formula 8)

wherein n is an integer of 0 to 2, m is an integer of 2 to 4, and p is a real number of 2 to 20,

(15) a diaphragm for a fuel cell comprising an impregnated film according to (14),

(16) a process for producing an impregnated film which comprises (i) coating a polytetrafluoro-ethylene stretched porous film with a dispersion composition comprising 100 parts by weight of a perfluoro-copolymer having repeating units represented by the following formula 4 and 200 to 10,000 parts by weight of at least one fluoro-oligoether having repeating units shown in the following formula 5, formula 6 or formula 7, and heating the composition at 160 to 340° C. under pressure to impregnate the voids of the polytetrafluoroethylene stretched porous film with the perfluoro-copolymer:

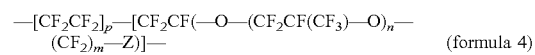  (formula 4)

wherein n is an integer of 0 to 2, m is an integer of 2 to 4, p is a real number of 2 to 20, and Z is $CO_2CH_3$ or $SO_2F$;

  (formula 5)

wherein each of q and r is such a real number that q+r is 6 to 100;

  (formula 6)

wherein each of q and r is such a real number that q+r is 6 to 100; and

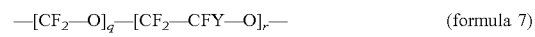  (formula 7)

wherein each of q and r is such a real number that q+r is 6 to 100, and Y is F or $CF_3$, and

(17) yarn obtained by slitting and/or uniaxial stretching an impregnated film according to (13) at 20 to 340° C.

BEST MODE FOR CARRYING OUT THE INVENTION

The present invention is concretely explained below.

(Dispersion Composition)

The dispersion composition of the present invention is characterized by comprising a perfluoro-copolymer having repeating units represented by the above (formula 1) and a liquid fluoro-oligomer(s) represented by the above (formula 2) or (formula 3).

(Perfluoro-copolymer that Constitutes the Dispersion Composition)

The perfluoro-copolymer having repeating units represented by the above (formula 1) which constitutes the dispersion composition of the present invention preferably has a molecular weight in a range of usually 10,000 to 1,000,000. When the melt index of the perfluoro-copolymer is measured at a temperature of 250 to 290° C. under a load of 2.16 kgf (21.2N) by means of an apparatus having an orifice with an inside diameter of 2.09 mm and a length of 8 mm, it is preferably in a range of usually 0.01 to 500 g/10 minutes (a converted value), more preferably 0.01 to 50 g/10 minutes (a converted value), which corresponds to a sufficiently high molecular weight to attain a high durability in practice.

As to the perfluoro-copolymer, a in the above (formula 1) is a real number in a range of 2 to 20. The symbol a has a value of 2 or more which can give a high polymerization degree and is suitable for practical purposes, and it has a value of 20 or less which permits a reduction of resistance. The value of a is properly chosen depending on the use of the copolymer and can be adjusted by properly choosing the polymerization conditions.

In particular, as the perfluoro-copolymer, that having repeating units represented by the above (formula 4) is commonly used and is preferable for industrial use.

The above-mentioned perfluoro-copolymer that constitutes the dispersion composition of the present invention has a marked characteristic in that $X^4$ in the above (formula 1) is $CO_2R^3$ (wherein $R^3$ is a hydrocarbon type alkyl group of 1 to 3 carbon atoms) or $SO_2F$ and that the copolymer is a nonelectrolyte type copolymer that can be fixed by melting with heating.

In the dispersion composition of the present invention, such perfluoro-copolymers of two or more kinds may be present as a mixture. A perfluoro-copolymer having functional groups of such a type that $X^4=CO_2R^3$ may contain acid type ($CO_2H$ type) structures formed by hydrolysis of the functional groups. The content of the acid type functional groups is preferably 5 mol % or less, more preferably 1 mol % or less, still more preferably 0.5 mol % or less, based on the total amount of carboxylic acid type functional groups (the total amount of $CO_2R^2$ type functional groups and $CO_2H$ type functional groups). This is because the thermal stability of the perfluoro-copolymer is deteriorated in some cases when the content of the acid type ($CO_2H$ type) functional groups is too high.

(Fluoro-oligomer(s) that Constitutes the Dispersion Composition)

As the fluoro-oligomer(s) that constitutes the dispersion composition of the present invention, at least one fluoro-oligomer is selected from liquid fluoroolefin telomers represented by the above (formula 2) or liquid fluoro-oligoethers represented by the above (formula 3). The term "liquid" used here means that even at a temperature of 60° C. or lower, the fluoroolefin telomers or fluoro-oligoethers are in a liquid or oil state and have fluidity. As the fluoroolefin telomer, $-(CF_2-CF_2)_s-$ or $-(CF_2-CFCl)_s-$ is used in which s is a real number of 6 to 10. Although the chemical structure of the molecular-chain end group of such a telomer is not particularly limited, a telomer having an excellent thermal stability is preferably used when treated at a high temperature. As such a fluoroolefin telomer, Daifloil (a trade name) is available from DAIKIN Industries, Ltd. The fluoro-oligoether is represented by $-[R_f^1-O]_q-[R_f^2-O]_r-$ wherein $R_f^1$ and $R_f^2$ are independently a perfluoroalkylene group of 1 to 4 carbon atoms and each of q and r is such a real number that q+r is 6 to 100. The fluoro-oligoether is preferable because it is advantageous in that its vapor pressure is low even at a high temperature because its molecules have a high degree of freedom owing to its ether linkages, so that a fluoro-oligoether having a higher molecular weight can be used. Although there is usually used a fluoro-oligoether in which q+r is approximately 6 to 60, a fluoro-oligoether having a higher molecular weight also has oily properties, i.e., fluidity owing to its ether structure, so that it is possible to use a high-molecular weight fluoro-oligoether having as many as 100 repeating units (q+r=100). The chemical structure of the molecular-chain end group of such a fluoro-oligoether is not particularly limited, though when the fluoro-oligoether is treated at a high temperature, it preferably has a structure stable at the treatment temperature, in particular, a structure having no carboxylic acid group at the end of the molecular chain. The above general formula (formula 3) includes structures containing repeating units of three or more different kinds, such as $-[CF_2-O]_{t1}-[CF(CF_3)-O]_{t2}-[CF(CF_3)-CF_2-O]_{t3}-$ wherein t1+t2+t3 is 6 to 100). Specific examples of the fluoro-oligoether are commercially and easily available fluoro-oligoethers having a structure represented by the above (formula 5), (formula 6) or (formula 7). As these fluoro-oligoethers, Krytox (a trade name) is available from E.I. du Pont de Nemours & Co., Demnam (a trade name) from DAIKIN Industries, Ltd., and FOMBLIN (a trade name) from Ausimont Co. These fluoro-oligoethers are preferable because all of them have a $CF_3$ group at the end of the molecular chain and hence have a thermally very stable structure. These fluoro-oligomers may be used singly or as a mixture thereof. Usually, as the fluoro-oligomer(s), a liquid one(s) which has a kinetic viscosity at 0 to 100° C. in a range of approximately 0.1 to 5 cm$^2$/sec is suitably used. The fluoro-oligomer(s) is properly selected from those having either a low viscosity or a high viscosity, depending on its use and purpose.

(Make-up of the Dispersion Composition)

The dispersion composition of the present invention comprises 100 parts by weight of the perfluoro-copolymer and 10 to 10,000 parts by weight of the fluoro-oligomer(s). When the proportion of the fluoro-oligomer(s) is less than 10 parts by weight per 100 parts by weight of the perfluoro-copolymer, the effects of the present invention are small. A proportion of the fluoro-oligomer(s) of more than 10,000 parts by weight is economically disadvantageous.

When the proportion of the fluoro-oligomer(s) is more than about 200 parts by weight per 100 parts by weight of the perfluoro-copolymer, the dispersion composition of the present invention can have a structure in which particles having an average particle size of 100 μm or less are stably dispersed. The dispersion composition having this structure usually has a whitely turbid, pasty form. The ratio between the perfluoro-copolymer and the fluoro-oligomer(s) varies depending on, for example, the EW and molecular weight of the perfluoro-copolymer and the properties and molecular weight of the fluoro-oligomer(s). The dispersion composition of the present invention is preferable for various purposes and from the viewpoint of storage stability. For example, a dispersion composition formed from a perfluoro-copolymer containing easily hydrolyzable $CO_2R^3$ type ($R^3$ is a hydrocarbon alkyl group of 1 to 3 carbon atoms) functional groups is characterized in that it is excellent in long-term storage stability as compared with the storage of the perfluoro-copolymer alone. A dispersion composition characterized by having a size of dispersed particles of the perfluoro-copolymer of 100 μm or less has a structure in which the liquid fluoro-oligomer(s) is present in excess and finely dispersed particles of the perfluoro-copolymer solvated and swollen by the fluoro-oligomer(s) are stably dispersed in the fluoro-oligomer(s). Therefore, even if the proportion of the fluoro-oligomer(s) is excessively increased, the properties of the dispersion composition of the present invention are maintained without a change, but an excessive increase is economically disadvantageous. When said dispersion composition containing the excess fluoro-oligomer(s) is allowed to stand for a long period of time, a whitely turbid, pasty material (a gel-like material) is precipitated to cause two-phase separation, but the characteristics of the dispersion composition are not affected by the separation at all as described above. In this case, the dispersion composition can be used as a homogeneous composition by stirring the same at the time of use. In this stable dispersion composition, the perfluoro-copolymer concentration can be increased by the removal of the excess fluoro-oligomer(s) by, for example, decantation or filtration under reduced pressure without deteriorating the inherent properties of said dispersion composition.

When the dispersion composition of the present invention comprises 100 parts by weight of the perfluoro-copolymer and 10 to about 200 parts by weight of the fluoro-oligomer(s), the composition itself forms a stable dispersion structure for its make-up. In this case, the formation of finely dispersed particles having an average particle size of 100 μm or less is difficult in some cases even when the fluoro-oligomer(s) is added in excess. On the other hand, such a dispersion composition can be used as pellets or a film by melt-shaping the composition and is excellent also in melt shapeability. During the melt-shaping, the excess liquid (fluoro-oligomer(s)) under the melt-shaping conditions is completely separated, while the melt of a composition composed of a homogeneous dispersion is formed. This melt usually contains not more than approximately 50 to 60 wt % of the fluoro-oligomer(s), and the upper limit of content of the fluoro-oligomer(s) varies depending on, for example, the EW and molecular weight of the perfluoro-copolymer and the properties and molecular weight of the fluoro-oligomer(s). When the concentration of the fluoro-oligomer(s) contained in the composition is less than the above concentration, the excess liquid (fluoro-oligomer(s)) is not separated, so that a homogeneous melt can be obtained. After this melt is made into pellets, if necessary, a film can be obtained therefrom in which the fluoro-oligomer(s) and perfluoro-copolymer are homogeneously dispersed.

Because of the characteristics described above, the weight ratio between the perfluoro-copolymer and the fluoro-oligomer(s) is usually determined depending on the use and purpose of the dispersion composition by choosing the amount of the fluoro-oligomer(s) added at the time of forming the dispersion composition from a polymerization liquid composition containing the perfluoro-copolymer or before the polymerization, the polymerization method and the polymerization conditions.

The term "average particle size of dispersed particles" used herein means an average particle size calculated after carrying out measurement with a laser diffraction type particle size distribution measuring apparatus by using a dispersion obtained by diluting the dispersion composition with the fluoro-oligomer(s) so that the content of the perfluoro-copolymer becomes about 0.1 wt %.

(Production Process of the Dispersion Composition)

For producing the dispersion composition of the present invention, there are two processes, i.e., a process in which the fluoro-oligomer(s) is added after the polymerization and a process in which the fluoro-oligomer(s) is previously added before the polymerization.

(Process for Producing the Dispersion Composition by Adding the Fluoro-oligomer(s) after the Polymerization)

In the process for producing the dispersion composition of the present invention, there is used a polymerization liquid composition containing a perfluoro-copolymer produced from at least one functional-group-containing perfluorocarbon monomer represented by the following (formula 9) and at least one fluoroolefin represented by the following (formula 10):

$$CF_2=CF-O-(CF_2-CF(CF_2X^3)-O)_b-(CFR^1)_c-(CFR^2)_d-(CF_2)_e-X^4 \quad \text{(formula 9)}$$

wherein $X^3$ is F or Cl, b is an integer of 0 to 2, c is 0 or 1, d and e are independently an integer of 0 to 6, provided that c+d+e is not equal to 0, $R^1$ and $R^2$ are independently F, Cl or a perfluoroalkyl or fluorochloroalkyl group of 1 to 10 carbon atoms, $X^4$ is $CO_2R^3$ or $SO_2F$, and $R^3$ is a hydrocarbon type alkyl group of 1 to 3 carbon atoms; and $$CF_2=CX^1X^2 \quad \text{(formula 10)}$$

wherein $X^1$ and $X^2$ are independently F or Cl.

As a process for producing the polymerization liquid composition, there can be adopted a well-known, generally used and conventional bulk polymerization process or solution polymerization process which is adopted for homopolymeriza-tion or copolymerization of fluorinated ethylene. As the polymerization conditions, conditions in wide ranges can be chosen so long as the perfluoro-copolymer produced does not become a complete solid in the polymerization liquid composition. For producing a dispersion composition composed of a fine dispersion, it is preferable to choose polymerization conditions that permit sufficient swelling of the perfluoro-copolymer produced. In addition, the conversion of the functional-group-containing perfluorocarbon monomer(s) represented by the above (formula 9) to the perfluoro-copolymer is preferably limited to a low value in some cases. The reason is that this limitation can inhibit the formation of a solid structure in the perfluoro-copolymer in the polymerization system.

In general, the polymerization temperature is preferably 10 to 80° C., more preferably 20 to 60° C. The initial reaction pressure is preferably 0.1 to 2 MPa, more preferably 0.1 to 1 MPa. As a solvent for polymerization used in the solution polymerization, generally and well known various fluorine-containing solvents can be used. There are used, for example, inert fluorine-containing solvents such as $CF_2ClCFCl_2$ (CFCl 13), $CClF_2CF_2CFHCl$ (HCFC225cb), $CF_3CHFCHFCF_2CF_3$ (HFC43-10mee), perfluoromethylcyclohexane, perfluorodimethylcyclobutane, perfluorooctane, perfluorobenzene, etc.

The "fluorine-containing solvents" used in the production process according to the present invention and described hereinafter refer to exactly the same solvents as the above-exemplified solvents.

In the production of the polymerization liquid composition containing the perfluoro-copolymer, the fluorine-containing solvent is usually used in a proportion of preferably 50 to 1000 parts by weight per 100 parts by weight of the functional-group-containing perfluorocarbon monomer(s) represented by the above (formula 9). There can also be employed bulk polymerization using the functional-group-containing perfluorocarbon monomer(s) itself as a solvent for polymerization. As a polymerization initiator, there can be used various oil-soluble polymerization initiators, for example, azo compounds such as azobisisobutyronitrile, etc.; diacyl peroxides such as benzoyl peroxide, dipentafluoropropionyl peroxide, etc.; peroxy esters such as t-butyl peroxyisobutyrate, etc.; and hydroperoxides such as diisopropylbenzene hydroperoxide, etc. Generally and well known chain transfer agents such as alkanes (e.g. pentane and hexane) and alkanols (e.g. methanol and ethanol) may be added in order to adjust the molecular weight of the perfluoro-copolymer.

In the production of the above-mentioned polymerization liquid composition, the perfluoro-copolymer is produced by the copolymerization of the functional-group-containing perfluorocarbon monomer(s) represented by the above (formula 9) and the fluoroolefin(s) represented by the above (formula 10). If necessary, two or more functional-group-containing perfluorocarbon monomers may be used at the same time, and a perfluorovinyl ether represented by the following (formula 11) may be co-used.

$$CF_2=CFOR_f \quad \text{(formula 11)}$$

wherein $R_f$ is a perfluoroalkyl group of 1 to 10 carbon atoms.

As the above-mentioned functional-group-containing perfluorocarbon monomer(s), there are used various monomers, for example, monomers having $CO_2CH_3$-type nonelectrolyte-type functional groups, such as $CF_2=CF-O-(CF_2)_2-CO_2CH_3$,
$CF_2=CF-O-(CF_2)_3-CO_2CH_3$,
$CF_2=CF-O-CF_2CF(CF_3)-O-(CF_2)_2-CO_2CH_3$,
$CF_2=CF-O-CF_2CF(CF_3)-O-(CF_2)_3-CO_2CH_3$, etc.; or monomers having $SO_2F$-type nonelectrolyte-type functional groups, such as $CF_2=CF-O-(CF_2)_2-SO_2F$,
$CF_2=CF-O-(CF_2)_3-SO_2F$,
$CF_2=CF-O-CF_2CF(CF_3)-O-(CF_2)_2-SO_2F$,
$CF_2=CF-O-CF_2CF(CF_3)-O-(CF_2)_3-SO_2F$, etc.

As the fluoroolefin(s) represented by the above (formula 10), tetrafluoroethylene is suitably used.

In the process for producing the dispersion composition of the present invention, the fluoro-oligomer(s) represented by the above (formula 2) or (formula 3) is added to the polymerization liquid composition containing the perfluoro-copolymer having repeating units represented by the above (formula 1), at a temperature of about 40° C. or lower, followed by stirring and mixing. Then, low-boiling compounds such as the unreacted functional-group-containing perfluorocarbon monomer(s) and the fluorine-containing solvent are removed at 150° C. or lower. As a method for removing the low-boiling compounds, there are suitably adopted two methods, i.e., a method of removing them under reduced pressure while conducting stirring and mixing with heating (method A) and a method of removing them by extraction with a hydrocarbon solvent (method B). The latter (method B) permits easier production of a dispersion composition composed of a more homogeneous and fine dispersion in a wider range, and it permits reduction of the amount of the fluoro-oligomer(s) used to a necessary and minimum amount and hence is economically preferable. Furthermore, the latter only requires operations that can be carried out easily.

In the method of removing the low-boiling compounds under reduced pressure with heating (method A), the heating temperature is preferably 150° C. or lower, more preferably about 90° C. or lower. This is because when the removal is carried out at too high a temperature, a part of the structure of the resulting dispersion composition consisting of the perfluoro-copolymer and the fluoro-oligomer(s) is destroyed, so that a large foreign solid with a particle size of 1 mm or more (a solid composed mainly of perfluoro-copolymer having a complete solid structure formed therein) is precipitated and separated in some cases. In this method (method A), the proportion of the fluoro-oligomer(s) used is preferably 2000 parts by weight or more, more preferably 5000 parts by weight or more, per 100 parts by weight of the perfluoro-copolymer. The reason is that when the proportion of the fluoro-oligomer(s) is low, the foreign solid is produced in some cases. However, even in such a case, the desired dispersion composition can be obtained by removing the precipitated foreign solid and separating it.

In the method of removing the low-boiling compounds by extraction with a hydrocarbon solvent (method B), the temperature is preferably 150° C. or lower, more preferably about 40° C. or lower. Usually, the removal by extraction is suitably carried out at ambient temperature and atmospheric pressure. In this case, almost no foreign solid is produced to be precipitated and separated, so that a dispersion composition composed of a homogeneous dispersion can be obtained in wide ranges of the proportions of the perfluoro-copolymer and the fluoro-oligomer(s). In particular, a dispersion composition containing a high concentration of the perfluoro-copolymer can easily be produced in one step, which is desirable. In this method, a hydrocarbon solvent is added to the above-mentioned polymerization liquid composition containing the perfluoro-copolymer, and the dispersion composition is formed by the addition of the fluoro-oligomer(s) necessary for obtaining a desired composition and stirring and mixing of the resulting mixture. The solvent and the polymerization liquid composition are stirred and mixed, and then allowed to stand to be separated into two layers, and the lower layer composed of a dispersion consisting of the perfluoro-copolymer and the fluoro-oligomer(s) (the dispersion varies in form from a pasty form to a powdery form, depending on the concentration of the perfluoro-copolymer, and is usually a whitely turbid dispersion) is collected. If necessary, the dispersion is repeatedly washed with a hydrocarbon solvent to extract and remove the unreacted functional-group-containing perfluorocarbon monomer(s), the fluorine-containing solvent and the like, which are low-boiling compounds contained in the dispersion. The hydrocarbon solvent is preferably one which is not miscible with the fluoro-oligomer(s), causes separation into two layers, and has a good miscibility with the compounds such as the unreacted functional-group-containing perfluorocarbon monomer(s) which should be removed by the washing. Therefore, conventional solvents are often used as the hydrocarbon solvent. Some examples of the hydrocarbon solvent are alkanols such as methanol, ethanol, etc.; alkanes such as hexane, heptane, etc.; ethers such as diethyl ether, etc.; ketones such as acetone, etc.; and esters such as ethyl acetate, etc. In order to remove fluorine-containing compounds remaining as low-molecular weight impurities effectively, a mixture of any of the above-exemplified hydrocarbon solvents and a fluorine-containing solvent may be used. In addition, it is preferable to conduct drying under reduced pressure with heating lastly in order to remove the residual low-boiling compounds completely. This is because when a large amount of the low-boiling compounds remains, voids are formed in some cases in the course of fixation by heating at a high temperature and melt shaping. The drying under reduced pressure with heating is preferably conducted at a temperature of 150° C. or lower and is usually conducted at a temperature of about 90° C. or lower. The above-mentioned addition of the fluoro-oligomer(s) in the production process of the dispersion composition of the present invention may be carried out after the dilution of the polymerization liquid composition and/or the fluoro-oligomer(s) with the fluorine-containing solvent and/or the functional-group-containing perfluorocarbon monomer(s).

(Process for Producing the Dispersion Composition by Adding the Fluoro-oligomer(s) Previously Before the Polymerization)

As a process for producing the dispersion composition of the present invention, a process of adding the fluoro-oligomer(s) previously before the start of the polymerization may be adopted. This is because the fluoro-oligomer(s) is thermally and chemically stable and is inactive in the polymerization. In said process of adding the fluoro-oligomer(s) previously before the start of the polymerization, there can be employed bulk polymerization using the functional-group-containing perfluorocarbon monomer(s) itself as a solvent for polymerization and solution polymerization using a fluorine-containing solvent as a solvent for polymerization. Moreover, water can be used as a solvent for polymerization. In the bulk polymerization and the solution polymerization, the fluoro-oligomer(s) may usually be added in any step before the start of the polymerization. In polymerization in an aqueous system (e.g. suspension polymerization or emulsion polymerization) using water as a solvent for polymerization, the fluoro-oligomer(s) is preferably used in the form of a solution prepared by previously dissolving the fluoro-oligomer(s) in the functional-group-containing perfluorocarbon monomer(s). The reason is that the solution permits production of a dispersion composition having a uniform composition. The polymerization conditions in the case of adding the fluoro-oligomer(s) previously before the start of the polymerization are exactly the same as the polymerization conditions described above. The amount of the fluoro-oligomer(s) added, the conversion of the functional-group-containing perfluorocarbon monomer(s), the pressure of the fluoroolefin gas(es), and the like are determined according to a desired dispersion composition. When water is used as a solvent for polymerization, the polymerization is usually carried out by adding a surfactant and optionally a buffer. As a polymerization initiator used in the polymerization in an aqueous system, various well-known and generally used water-soluble initiators can also be used in addition to the above-exemplified oil-soluble initiators. The water-soluble initiators include, for example, inorganic peroxides such as potassium persulfate, ammonium persulfate, etc.; redox initiators such as ammonium persulfate-ferrous sulfate, ammonium persulfate-ammonium hydrogensulfite, etc.; and water-soluble organic peroxides such as disuccinoyl peroxide, etc. Irrespective of the kind of the initiator, it is preferable in some cases to reduce sufficiently the average particle size of drops of oil of the functional-group-containing perfluorocarbon monomer(s) containing the fluoro-oligomer(s) dissolved therein to 2 μm or less, more preferably to the submicron level and then carry out copolymerization in the drops of oil. In addition, it is preferable in some cases to adopt a method in which an alcohol or the like is added according to the method disclosed in U.S. Pat. No. 5,608,022. After bulk polymerization or solution polymerization and after the polymerization in an aqueous system followed by washing-away of the aggregated surfactant, salts and the like according to the well-known and generally used method, low-boiling compounds are removed from the composition obtained at 150° C. or lower. This is carried out in the same manner as in the process for producing the dispersion composition by adding the fluoro-oligomer(s) after the polymerization as described above. Thus, the dispersion composition of the present invention can be produced.

(Process for Forming a Perfluoro-copolymer Layer Containing Solid Particles Dispersed Therein on a Substrate Membrane)

As a substrate membrane used in a process for producing the fluorine-containing cation-exchange membrane (diaphragm for electrolysis or diaphragm for fuel cell) or membrane-electrodes assembly of the present invention, there are used substrate films such as polytetrafluoroethylene films, polyimide films, aluminum foil, etc.; and fluorine-containing cation-exchange membranes. When a perfluoro-copolymer layer containing solid particles dispersed therein is formed on the above-exemplified substrate film, the resulting membrane is usually transferred to a fluorine-containing cation-exchange membrane (a substrate membrane) by a method such as a thermal transfer method. As the fluorine-containing cation-exchange membrane (a substrate membrane), there is preferably used a fluorine-containing cation-exchange membrane containing nonelectrolyte type functional groups which is composed of one or more layers of a copolymer having repeating units represented by the (formula 12) shown below and optionally a filler of another fluorocarbon polymer, cloth or the like, which is embedded in the layer(s) as a reinforcing material.

The fluorine-containing cation-exchange membrane (diaphragm for electrolysis or diaphragm for a fuel cell) or membrane-electrodes assembly obtained by the production process according to the present invention is used after the conversion of the nonelectrolyte type ($SO_2F$ type and/or $CO^2R^3$ type) functional groups contained therein to salt type ($SO_3Na$ type and/or $CO_2Na$ type, or the like) or acid type ($SO_3H$ type and/or $CO_2H$ type) functional groups. When used as a diaphragm for sodium chloride electrolysis, the membrane is hydrolyzed at a temperature of 10 to 95° C. by the use of an aqueous alkali metal hydroxide solution or an aqueous alkali metal hydroxide solution containing an organic solvent (e.g. an alcohol or dimethyl sulfoxide) as a swelling agent. Then, if necessary, the nonelectrolyte type functional groups are converted to Na type functional groups by using sodium hydroxide, sodium hydrogen carbonate or the like. When used as a diaphragm for a fuel cell, the membrane is hydrolyzed, after which the nonelectrolyte type functional groups are converted to H type functional groups by treatment using an inorganic acid such as hydrochloric acid, sulfuric acid or the like. As a method for converting the functional groups as above, any of various generally and well known methods are used.

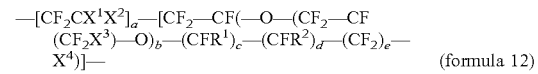
(formula 12)

wherein $X^1$, $X^2$ and $X^3$ are independently F or Cl, a is a real number of 2 to 20, b is an integer of 0 to 2, c is 0 or 1, d and e are independently an integer of 0 to 6, provided that c+d+e is not equal to 0, $R^1$ and $R^2$ are independently F, Cl or a perfluoroalkyl or fluorochloroalkyl group of 1 to 10 carbon atoms, $X^4$ is $CO_2R^3$ or $SO_2F$, and $R^3$ is a hydrocarbon type alkyl group of 1 to 3 carbon atoms.

In the present inventive process for forming a perfluoro-copolymer layer containing solid particles dispersed therein on a substrate membrane, (i) 10 to 1000 parts by weight of one or more kinds of solid particles selected from at least one group among three groups, i.e., (1) a group of alkali-resistant inorganic material particles, (2) a group of electrode powders and (3) a group of sacrificial particles are mixed and kneaded with a dispersion composition comprising 100 parts by weight of a perfluoro-copolymer having repeating units represented by the above (formula 1) and 10 to 10,000 parts by weight of at least one fluoro-oligomer having repeating units shown in the following (formula 2) or (formula 3), to form a pasty or powdery dispersion composition, after which (ii) the fluoro-oligomer(s) is removed from said dispersion composition by extraction with a fluorine-containing solvent to form a powdery solid-particle-dispersion composition containing the perfluoro-copolymer and solid particles as dispersoids, and (iii) said solid-particle-dispersion composition is fixed on the surface of a substrate membrane by heating at 160° C. to 340° C. to form a perfluoro-copolymer layer containing the solid particles dispersed therein on the substrate membrane.

In the dispersion composition of the present invention, i.e., the dispersion composition of the perfluoro-copolymer and the fluoro-oligomer(s), the content of the perfluoro-copolymer is preferably 1 to 90 wt %, more preferably 2 to 70 wt %, still more preferably 5 to 40 wt %. The reason is as follows. When the content of the perfluoro-copolymer is too low, the fluoro-oligomer(s) is contained in a large excess, which is economically disadvantageous. When the content of the perfluoro-copolymer is too high, the composition has a whitely turbid, powdery form and a large particle size, so that it becomes difficult to form a perfluoro-copolymer layer containing solid particles homogeneously dispersed therein on a substrate membrane.

The solid particles used in the production process according to the present invention are one or more kinds of solid particles selected from at least one group among three groups, i.e., (1) a group of alkali-resistant inorganic material particles, (2) a group of electrode powders and (3) a group of sacrificial particles.

As the alkali-resistant inorganic material particles of the group (1), there are used alkali-resistant inorganic material particles of at least one compound selected from an oxide, nitride and carbide of an element selected from group IV in the Periodic Table, for example, alkali-resistant inorganic material particles of zirconium oxide.

As the electrode powder of the group (2), there is used, for example, electrode powder composed of one or more kinds of materials selected from the metals of the platinum group and oxides thereof, or electrode powder composed of two or more kinds of carbon powders supporting thereon iron, nickel, stainless steel, Raney nickel, carbonyl-nickel or a metal of the platinum group.

As the sacrificial particles of the group (3), there are used one or more kinds of solid particles selected from alkali-soluble polymer particles of a polyamide, polyester or the like, metal particles such as aluminum powder, and neutral inorganic salt particles of a halogenated alkali metal salt or the like. The sacrificial particles of the group (3) are characterized in that they can be released by dissolution in water, an alkali or an acid to form a porous structure, in the above-mentioned treating step in which the functional groups contained in the fluorine-containing cation-exchange membrane are converted from a nonelectrolyte type to an electrolyte type. It is also possible to use two or more different kinds of particles by selecting one or more kinds of particles from each of two or more of the above three groups. In this case, there is usually used a mixture of two kinds of particles, i.e., alkali-resistant inorganic material particles selected from the group (1) and sacrificial particles selected from the group (3), or a mixture of two kinds of particles, i.e., electrode powder selected from the group (2) and sacrificial particles selected from the group (3).

The solid particles used in the production process according to the present invention are preferably not pyrolyzed at the temperature of fixation by heating (chosen in a temperature range of 160° C. to 340° C.). When the solid particles are sacrificial particles of the group (3), they may be melted at the temperature of fixation by heating. The shape and particle size of the solid particles are not particularly limited. The particle size may be chosen in a wide range of about 0.001 to about 100 μm, and is preferably about 0.01 to about 10 μm. The particle size is chosen and determined depending on the use and purpose of the solid particles.

The solid particles used in the production process according to the present invention are preferably used in a proportion of 10 to 1000 parts by weight per 100 parts by weight of the perfluoro-copolymer contained in the present inventive dispersion composition containing the perfluoro-copolymer and the fluoro-oligomer(s) as dispersoids. Although the proportion of the solid particles is properly determined depending on their use and purpose, the ratio of the perfluoro-copolymer to the solid particles is preferably as follows: the perfluoro-copolymer/the solid particles=20/80 by volume or more, more preferably 40/60 by volume or more. The term "volume" used here means a net volume excluding voids (weight/true specific gravity). The reason for the above ratio is as follows: when the content of the solid particles is too high, resin layers formed from the perfluoro-copolymer are not connected to one another and become brittle in some cases, or a sufficient adhesive strength cannot be attained in some cases after fixation to a substrate membrane by fusion.

In the present inventive process for forming a perfluoro-copolymer layer containing solid particles dispersed therein on a substrate membrane, (i) the above-mentioned solid particles are mixed and kneaded with a dispersion composition comprising a perfluoro-copolymer having repeating units represented by the above (formula 1) and a fluoro-oligomer(s) having repeating units shown in the following (formula 2) or (formula 3), in a proportion of 10 to 1000 parts by weight per 100 parts by weight of the perfluoro-copolymer constituting the dispersion composition, to form a pasty or powdery solid-particle dispersion composition. In this case, the properties, viscosity or the like of the solid-particle dispersion composition is adjusted so as to be suitable for the intended purpose, by adding the fluoro-oligomer(s) according to the particular need. Preferably, the solid particles used are previously and thoroughly dehydrated (dried). The reason is that otherwise, their affinity for the fluoro-oligomer(s) is deteriorated, so that the solid particles cannot be homogeneously mixed with the dispersion composition of the present invention in some cases. When highly hydroscopic solid particles are mixed and kneaded with the dispersion composition, the mixing and kneading are preferably conducted in a dry environment. Although a generally and well known method is adopted for the mixing and kneading, it is preferable in some cases to disperse the solid particles finely by mechanical shattering by the use of a kneading and/or grinding apparatus such as a ball mill, homogenizer, ultrasonic shattering machine, or the like. The temperature during mixing and kneading is preferably 150° C. or lower. Usually, the mixing and kneading are easily conducted at ambient temperature, whereby a pasty or powdery solid-particle-dispersion composition is formed. When the solid particles have a high chemical stability and are inactive to the perfluorocarbon monomer(s) and the like in the above-mentioned polymerization liquid composition, they may also be added in the production of the dispersion composition of the present invention. This method may be adopted in place of the method described in the above step (i) to form a pasty or powdery solid-particle dispersion composition.

Then, (ii) the fluoro-oligomer(s) is removed from the solid-particle-dispersion composition by extraction with a fluorine-containing solvent. The temperature at the removal of the fluoro-oligomer(s) by extraction is usually not higher than the boiling point at atmospheric pressure of the fluorine-containing solvent used, though the removal can be suitably carried out also at ambient temperature. As a method for the removal by extraction, any of various generally and well known methods can be used, though the method is preferably determined depending on the finally formed structure of a perfluoro-copolymer layer containing the solid particles dispersed therein, by repeating trial and error according to the purpose and use of the resulting composition because the fine structure in the solid-particle dispersion composition containing the perfluoro-copolymer and the solid particles as dispersoids is formed during the removal of the fluoro-oligomer(s) by extraction. However, usually, a desired structure can easily be formed by adopting, for example, a washing-away method comprising repeating the addition of a fluorine-containing solvent, standing and then the removal of the supernatant, a method comprising carrying out filtration under reduced pressure with stirring, or a method comprising dialysis against a fluorine-containing solvent through a semipermeable membrane. After the fluoro-oligomer(s) is thoroughly washed away by any of these methods, the residual fluorine-containing solvent is removed by drying under reduced pressure at a temperature of usually about 110° C. or lower. This is because if the fluorine-containing solvent remains, it forms void defects during the fixation of the composition by heating carried out at a high temperature.

Subsequently, (iii) the solid-particle dispersion composition thus obtained is fixed by heating at preferably 160 to 340° C., more preferably 180 to 300° C. As the temperature of fixation by heating, a temperature of 160° C. or higher is chosen from the viewpoint of the sufficient fusion of the perfluoro-copolymer constituting the dispersion composition, the formation of a solid structure, and the structural stability and performance stability after coating of a fluorine-containing cation-exchange membrane as a substrate with the composition. As the temperature of fixation by heating, a temperature of 340° C. or lower is chosen from the viewpoint of the heat-decomposability of the perfluoro-copolymer. The temperature employed at the fixation by heating is properly determined depending on the physical properties (EW and MI) of the perfluoro-copolymer constituting the dispersion composition of the present invention. Usually, the fixation by heating is preferably carried out at a high temperature when the perfluoro-copolymer has a high EW value.

In the production process according to the present invention, the solid-particle dispersion composition obtained by the method described in the above step (ii) may be used after being melt-shaped into pellets or a film. The solid-particle dispersion composition may be used also in the form of a film obtained from a powder of the solid-particle dispersion composition or pellets formed by melt-shaping of the composition, by a generally and well known method such as a melt and pressure pressing method or a melt extrusion film formation method. In addition, the solid-particle dispersion composition may be melt-laminated on a substrate membrane. Moreover, there may be adopted a method comprising applying a powder of the solid-particle dispersion composition on a substrate membrane and then fixing the powder by heating to coat the substrate membrane therewith, or the solid-particle dispersion composition may be transferred to a substrate membrane by a thermal transfer method.

When the method employing melt-shaping is adopted, it is preferable in some cases to make the pasty or powdery dispersion composition into pellets as it is after the treatment (i) among the above-mentioned treatments (without carrying out the subsequent treatments (ii) and (iii)) and use the pellets as a ternary composite resin consisting of the perfluoro-copolymer, the fluoro-oligomer(s) and the solid particles. In this melt-kneading and pelletizing procedure, the excess fluoro-oligomer(s) under the conditions for the procedure becomes liquid and is separated and removed. The reason is that the fluidity of the melt is improved by a plasticizing effect due to the presence of the fluoro-oligomer(s), so that the melt can easily be made into a thin layer in extrusion film formation or the like. According to this method, a thin layer having a thickness of 5 to 25 μm or less can easily be obtained. A film is obtained, for example, by melt extrusion film formation by using the pellets of the ternary composite resin obtained above, and then the fluoro-oligomer(s) is removed by the use of a fluorine-containing solvent. When the perfluoro-copolymer has a high EW value and a high crystallinity, voids can be left in the film by this removal of the fluoro-oligomer(s). Moreover, it is also possible to form a film completely free from voids by adding a step of melt pressing or the like if necessary, and a step is chosen depending on the use and purpose of the film. On the other hand, when the perfluoro-copolymer has a low EW value and a low crystallinity, voids in the film are removed by the above-mentioned removal of the fluoro-oligomer(s). The resulting film is excellent also in stretchability at a low temperature (for example, ambient temperature), and it is stretched to be as thin as necessary, and is then laminated on a substrate membrane with heating, whereby a multilayer structure fit for a particular purpose can be formed. When the voids are intentionally left, it is also possible to adopt, for example, a method in which the film is tautly fixed in order to prevent the shrinkage of the film in the removal of the fluoro-oligomer(s) by washing and extraction with a fluorine-containing solvent, and is, if necessary, fixed by heating at about 150° C. or lower.

When the above-mentioned method employing melt-shaping is adopted, a sufficient measure against waste gas and a sufficient measure to prevent harm should be taken because a gas tends to be produced by decomposition, depending on the kind of the fluoro-oligomer(s), if the melt-shaping temperature is higher than 260° C. Slight pyrolysis of the fluoro-oligomer(s) does not inhibit the formation of the structure of the pellets or film.

In the formation of a perfluoro-copolymer layer containing the solid particles dispersed therein on a substrate membrane in the above step (iii) in the production process according to the present invention, when the substrate membrane is coated with the solid-particle dispersion composition (powder), there may be adopted, for example, a method comprising dispersing said solid-particle dispersion composition (powder) previously in water, a hydrocarbon organic solvent, a fluorine-containing solvent, or a mixture thereof, spray-coating the substrate membrane with the resulting dispersion, drying the dispersion, and then fixing the dispersion on the substrate membrane by heating at 160 to 340° C. Alternatively, there may be adopted a method comprising forming a layer of the solid-particle dispersion composition previously on the above-exemplified substrate film (e.g. a polytetrafluoro-ethylene film or aluminum foil) other than fluorine-containing cation-exchange membranes, and transferring this layer thermally to a fluorine-containing cation-exchange membrane (substrate membrane). In these methods, various generally and well known methods can be adopted and are properly selected depending on their use and purpose. If necessary, a coating layer and optionally a multilayer structure composed of a large number of layers are formed by repeating the above-mentioned treatment. When a very thin layer is formed on a substrate membrane, it is preferable to choose particles with a small primary-particle size as the solid particles and grind the formed solid-particle dispersion composition (a powdery material) finely and mechanically after dispersing the composition in water, a hydrocarbon organic solvent, a fluorine-containing solvent, or a mixture thereof if necessary.

In the production process according to the present invention, the following is possible: the above-mentioned order of the steps of (ii) removing the fluoro-oligomer(s) by the use of a fluorine-containing solvent, and (iii) fixing the solid-particle dispersion composition by heating at 160 to 340° C. is reversed, namely, at first, the composition containing as dispersoids the fluoro-oligomer(s), perfluoro-copolymer and solid particles is applied on a substrate membrane and fixed thereon by heating at 160 to 340° C., and then the fluoro-oligomer(s) is removed by using a fluorine-containing solvent. In this case, a sufficient measure against waste gas and a sufficient measure to prevent harm should be taken because a gas tends to be produced by decomposition, depending on the kind of the fluoro-oligomer(s), if the temperature at the fixation by heating is higher than 260° C. Slight pyrolysis of the fluoro-oligomer(s) does not inhibit the formation of the structure of a layer of the dispersion composition.

For applying the dispersion composition of the present invention on a substrate membrane, a well-known and generally used method such as a screen printing method, a spray coating method or the like can be adopted. In the spray coating, there may be used a liquid obtained by previously diluting the composition with a fluorine-containing solvent. In this case, the fluorine-containing solvent is removed before the heating at 160 to 340° C. These methods are effective in forming, in particular, a thin layer of the solid-particle dispersion composition on a substrate membrane. As the dispersion composition of the present invention used, a composition consisting of 100 parts by weight of the per-fluoro-copolymer and 200 to 10,000 parts by weight of the fluoro-oligomer(s) and having a size of dispersed particles of 100 μm or less is preferable. In this case, the adhesive strength between a coating layer and the substrate membrane can be increased by carrying out fixation by heating at 160 to 340° C. once more. It is also possible to adopt a method in which the above-exemplified substrate film (e.g. a poly-tetra-fluoroethylene film or aluminum foil) other than fluorine-containing cation-exchange membranes is used as a substrate membrane, and a perfluoro-copolymer layer containing the solid particles dispersed therein is formed on said substrate film at first, and then transferred to a fluorine-containing cation-exchange membrane (another substrate membrane) by a thermal transfer method. In these methods, generally and well known methods can be adopted.

The composite membrane thus obtained by the production process according to the present invention, i.e., the fluorine-containing cation-exchange membrane (diaphragm for electrolysis or diaphragm for a fuel cell) or membrane-electrodes assembly, which has at least one perfluoro-copolymer layer containing the solid particles dispersed therein, has as this layer a coating layer(s) containing alkali-resistant inorganic material particles and/or electrode powder(s) as dispersoids, or a layer(s) containing, as a dispersoid, sacrificial particles capable of forming a porous structure after the conversion of the functional groups to electrolyte type (Na salt type or the like) functional groups, and is so excellent that functions corresponding to the characteristics of solid particles of each kind are imparted to the composite membrane. In such a composite membrane obtained by the production process according to the present invention, the constitutional conditions (e.g. thickness and EW) of the perfluoro-copolymer and solid particles, which constitute a layer of the dispersion composition, and layers which constitute a fluorine-containing cation-exchange membrane used as a substrate are determined depending on the use and purpose of each component and are not particularly limited.

When alkali-resistant inorganic material particles or electrode powder is selected as the solid particles, the surface of the membrane is usually coated with a thin layer. The coating density is preferably about 0.01 to about 10 mg, more preferably about 0.05 to about 5 mg per cm².

In the case of employment of the composite membrane as a diaphragm for electrolysis, when sacrificial particles are selected as the solid particles, a $SO_2F$ type perfluoro-copolymer is usually employed, and a layer of approximately 10 to 100 μm in thickness is formed on the anode compartment side of the membrane, with cloth embedded in the layer as a reinforcing material if necessary. Usually, a porous layer is formed during the conversion to Na type functional groups or at the time of electrolysis.

In particular, in the case of employment of the composite membrane as a diaphragm for electrolysis, when the diaphragm for electrolysis has a perfluoro-copolymer layer containing alkali-resistant inorganic material particles dispersed therein which is formed on the anode surface and/or cathode surface of the membrane, it has the following characteristic: it can achieve voltage reduction due to a sufficient preventive effect on gas adhesion, and moreover, it can retain this performance characteristic stably for a long period of time and is excellent in durability because of the strong adhesion of the perfluoro-copolymer layer to a substrate membrane. In the case of a diaphragm for electrolysis having a perfluoro-copolymer layer containing alkali-resistant inorganic material particles dispersed therein which is produced by a conventional technique using a polymer solution consisting of a $SO_3H$ type perfluoro-copolymer and a mixture of water and an alcohol, the immersion of the diaphragm in a mixed solution of water and ethanol (50/50 by volume) under reflux for 30 minutes removes 90% or more of the coating layer owing to the swelling history during the immersion. On the other hand, in the diaphragm for electrolysis obtained by the process according to the present invention, the rate of peeling of the coating layer under the same conditions as above can be reduced to 50% or lower (20% or lower by proper choice of the conditions of fixation by heating). Thus, this diaphragm possesses markedly improved long-term durability and performance stability under various histories.

Furthermore, this diaphragm is markedly characterized in that the current efficiency of the membrane can also be improved when there is used a carboxylic acid type perfluoro-copolymer having repeating units of the above (formula 1) wherein $X^4=CO_2R^3$ or the above (formula 4) wherein $Z=CO_2CH_3$, and a layer of said carboxylic acid type copolymer containing alkali-resistant inorganic material particles dispersed therein is formed on a fluorine-containing cation-exchange film used as a substrate. This coating layer can be thinned in coating the membrane. Therefore, when the EW value of the carboxylic acid type perfluoro-copolymer used is increased, a high current efficiency and a low voltage can be attained at the same time, so that the diaphragm for electrolysis obtained by the process according to the present invention is superior in functions to conventional ones. The substrate membrane used preferably has at least one layer of carboxylic acid as a layer(s) on the cathode side. The reason is that the sodium chloride concentration in sodium hydroxide produced by sodium chloride electrolysis can be reduced. In such a diaphragm for sodium chloride electrolysis, the EW value of the carboxylic acid layer of the substrate membrane can be reduced while maintaining a high current efficiency owing to the carboxylic acid type copolymer layer containing alkali-resistant inorganic material particles dispersed therein, and the difference between the EW value of the carboxylic acid layer of the substrate membrane and the EW value of a sulfonic acid layer adjacent to the carboxylic acid layer can be reduced, so that the peel resistance of the boundary surface between the resins of the two layers can be improved.

The membrane having a perfluoro-copolymer layer containing electrode powder dispersed therein is used as electrodes (when the substrate membrane is a polytetrafluoroethylene film or the like) or membrane-electrodes assembly (when the substrate membrane is a fluorine-containing cation-exchange membrane) for electrolysis or a fuel cell. For example, when said membrane is used as a membrane-electrodes assembly for a fuel cell, a voltage loss caused by a problem concerning the boundary surface between the membrane and an electrode layer can be reduced. Moreover, said membrane can exhibit a high durability because the structure of the perfluoro-copolymer resin layer constituting the electrode layer is firm. In the formation of this gaseous-diffusion electrode layer, a desired structure can be formed by previously incorporating sacrificial particles to control the porous structure in said layer, or utilizing the swelling of the perfluoro-copolymer resin caused at the time of the conversion of the functional groups from a nonelectrolyte type to an electrolyte type, or properly employing a hot-pressing step or the like after the conversion to the electrolyte type. When said membrane is used as a membrane-electrodes assembly for a fuel cell, the utilization of a catalyst can be improved by, if necessary, impregnating voids with a $SO_3H$ type perfluoro-copolymer by the use of a solution of the $SO_3H$ type perfluoro-copolymer in water/alcohol after the conversion of functional groups contained in the original perfluoro-copolymer to $SO_3H$ type functional groups to improve the adhesion of the catalyst to the electrode powder.

(Impregnated Film Obtained by Impregnating a Polytetrafluoro-ethylene Stretched Porous Film with a Perfluoro-copolymer)

The impregnated film of the present invention obtained by impregnating a polytetrafluoroethylene stretched porous film (hereinafter, EPTFE film) with a perfluoro-copolymer having repeating units represented by the above (formula 1) or (formula 4) is markedly characterized in that functional groups contained in the perfluoro-copolymer are nonelectrolyte type functional groups capable of permitting melt shaping and fusion by heating, so that the impregnated film is very excellent in structural stability.

The reason why the EPTFE film made of a polytetrafluoroethylene is chosen as a substrate is that the polytetrafluoroethylene has a high chemical and thermal stability. In addition, the EPTFE film used as substrate has a network structure of fibrillated polytetrafluoroethylene fibers and hence is preferable for attaining a high strength. Moreover, the EPTFE film is suitable because the polytetra-fluoroethylene fiber and a $—(CF_2)—$ chain in the molecular chain of the perfluoro-copolymer can interact with each other satisfactorily. In the substrate film, the film thickness, the average pore size of pores and the void content are not particularly limited. They are chosen in wide ranges, depending on the use and purpose of the substrate film. Examples thereof are as follows: the film thickness is usually about 5 to about 200 μm, the average pore size of pores is usually about 0.1 to about 100 μm, and the void content is usually about 50 to about 95%.

The present inventive EPTFE film impregnated with the perfluoro-copolymer has a very high structural stability because the perfluoro-copolymer having nonelectro-lyte type functional groups capable of permitting fusion by heating and the fibrillated polytetrafluoroethylene fibers of the EPTFE film interact with each other strongly. Said impreg-nated film has a very high dimensional stability also during the optional formation of a composite from the impregnated film and conversion of the functional groups contained therein to salt type or acid type functional groups.

The impregnated film can maintain the inherent firm structure of the perfluoro-copolymer and hence has a high durability also after being put to practical use by the conversion of the functional groups to the salt type or acid type functional groups.

An example of this high durability is described below by taking the case of an EPTFE film impregnated with a perfluoro-copolymer containing $SO_3H$ type functional groups and having repeating units represented by the above (formula 8) which is formed from the present inventive EPTFE film impregnated with a perfluoro-copolymer having repeating units represented by the above (formula 4) wherein $Z=SO_2F$, by hydrolysis and the conversion of the functional groups of this copolymer to acid type functional groups. The former impregnated film has such a high structural stability that even when it is heat-treated at 120° C. for 4 hours in a mixed solution of water and ethanol (50/50 by volume), the amount of the perfluoro-copolymer containing $SO_3H$ type functional groups dissolved and extracted is one-half or less (50 wt % or less) of the initial amount of the functional-group-containing perfluoro-copolymer contained therein. The perfluoro-copolymer dissolved and extracted in this case comprises components having a low EW value and a low molecular weight. Therefore, the structural stability and durability can be further improved by increasing the molecular weight of the perfluoro-copolymer infiltrated at first, and/or previously removing the components having a low EW value and a low molecular weight. By contrast, in conventional techniques, an EPTFE film is impregnated with a solution prepared by dissolving a $SO_3H$ type perfluoro-copolymer previously in a mixed solution of water and an alcohol. In the case of this perfluorocarbon copolymer whose structure is destroyed by the dissolution with heating while having $SO_3H$ type functional groups, the structure is almost completely destroyed by the history of the above-mentioned heat-treatment at 120° C. for 4 hours in a mixed solution of water and ethanol (50/50 by volume) (substantially a large portion (more than 90%) of the resin is released by dissolution and/or taken off). This property is not inherent in a material for impregnating an EPTFE film therewith but inherent in the $SO_3H$ type perfluoro-copolymer itself that has already undergone the history of the dissolution with heating to undergo a remarkable structure change. Said property is similarly observed also in, for example, a cast film produced from a solution of a $SO_3H$ type perfluoro-copolymer in water/alcohol. In a conventional technique involving this dissolution of a $SO_3H$ type perfluoro-copolymer in a mixed solution of water and an alcohol, the increase of the EW value and/or molecular weight of the perfluoro-copolymer is limited because of the limitation of the solubility. The above fact suggests that a diaphragm for a fuel cell produced by a conventional process may be poor in long-term durability even under milder practical-use conditions, for example, in a water environment.

As a diaphragm for electrolysis, the present inventive EPTFE film impregnated with a perfluoro-copolymer containing $CO_2CH_3$ type functional groups and having repeating units represented by the above (formula 4) can be used after, if necessary, laminating a film of a perfluoro-copolymer containing $SO_2F$ type functional groups on the anode surface of the EPTFE film with heating, and then converting the same to an ion-exchange membrane having salt type functional groups.

The present inventive EPTFE film impregnated with a perfluoro-copolymer is excellent in melt-shapeability because the functional groups contained therein are of a $CO_2R^3$ type (a carboxylic acid ester type) or a $SO_2F$ type. Various composite structures can be formed, for example, by laminating this impregnated film and another substrate film having the same functional groups as those of the impregnated film by melt adhesion, or forming a layer containing solid particles dispersed therein on the impregnated film. Therefore, the impregnated film can be utilized in a wide range as a material for a fluorine-containing cation-exchange membrane (a diaphragm for electrolysis or a diaphragm for a fuel cell) or a membrane-electrodes assembly.

(Yarn)

The yarn of the present invention is that obtained by slitting and/or uniaxial stretching at 20 to 340° C. of the above-mentioned impregnated film, and is a high-strength yarn obtained by impregnation with the perfluoro-copolymer containing nonelectrolyte type functional groups. This yarn is characterized by usually comprising 5 to 50 wt % of a fibrillated polytetrafluoroethylene and 50 to 95 wt % of the perfluoro-copolymer containing nonelectrolyte-type functional groups and having repeating units represented by the above (formula 1) or (formula 4), the voids of said fibrillated polytetrafluoroethylene being impregnated with the perfluoro-copolymer. This yarn may be used as it is as yarn (or tape yarn) produced by slitting the above-mentioned impregnated film obtained by impregnating an EPTFE film with the perfluoro-copolymer. If necessary, the yarn may be uniaxially stretched, and the conditions of the uniaxial stretching are determined according to the properties of the above-mentioned impregnated film obtained by impregnating an EPTFE film with the perfluoro-copolymer. Usually, the yarn is produced by slitting said impregnated film (or tape yarn) if necessary, followed by uniaxial stretching at a draw ratio of approximately 1.2 to 20 at 20 to 340° C. As a method for the production and a method for the stretching, various generally and well known methods may be adopted.

When used in a diaphragm for electrolysis, the present inventive perfluorocarbon yarn containing nonelectrolyte type functional groups can be used usually after the following treatments: the yarn is slit and/or stretched to a yarn thickness of approximately 40 to 400 denier (an average yarn 10 diameter of approximately 50 to 150 μm), twisted if necessary, and woven alone or together with a sacrificial core material into cloth having a cloth opening of approximately 10- to 30-mesh, and the cloth is laminated on a fluorine-containing cation-exchange membrane (a substrate membrane) with heating at 160 to 340° C. to obtain a reinforced fluorine-containing cation-exchange membrane. This laminating with heating permits impartment of a high adhesive strength between the resin portion of the substrate membrane and the cloth used as a reinforcing material. This is because the cloth itself of the perfluorocarbon yarn comprises the nonelectrolyte type perfluoro-copolymer that can be melted and fused. Furthermore, the cloth as reinforcing material formed of the perfluorocarbon yarn of the present invention can realize a low electrolysis voltage while retaining its high strength, because the cloth itself is permeable to ions when used, for example, for sodium electrolysis after the conversion of the functional groups contained in the yarn to electrolyte type functional groups. Thus, the cloth has many advantages that have not been obtained before.

The cloth as reinforcing material produced from the present inventive yarn containing nonelectrolyte type functional groups is used in a diaphragm for electrolysis as follows. When the functional groups are of a $SO_2F$ type, the cloth is usually laminated between layers each composed of a fluorine-containing cation-exchange membrane (a substrate membrane) comprising a $SO_2F$ type perfluoro-copolymer. When the functional groups are of a $CO_2R^3$ type, the cloth may be used by embedding the cloth in a layer of a $CO_2R^3$ type perfluoro-copolymer (a layer on the cathode surface side).

(Process for Producing an Impregnated Film Comprising Impregnating the Voids of an EPTFE Film With a Perfluoro-copolymer)

In the present inventive process for producing an impregnated film comprising impregnating the voids of an EPTFE film with a perfluoro-copolymer containing nonelectrolyte type functional groups, the dispersion composition of the present invention is applied on the EPTFE film and heated at 160 to 340° C. under pressure to be fixed by the heating simultaneously with impregnation of the voids of the EPTFE film with the perfluoro-copolymer, whereby a porous film comprising the perfluoro-copolymer containing a fluoro-oligomer(s) is formed at first. Then, the fluoro-oligomer(s) is washed away with a fluorine-containing solvent. As the dispersion composition of the present invention, that having an average particle size of dispersed particles of 100 μm or less is suitably used. The reason is that even the voids of an EPTFE film having an average pore size of as small as 0.1 μm can easily be impregnated with the perfluoro-copolymer (or the perfluoro-copolymer containing a fluoro-oligomer(s)). In the dispersion composition of the present invention, usually the proportion of the perfluoro-copolymer is preferably high so long as the perfluoro-copolymer forms a stable dispersion. This is because a high proportion permits impregnation of the voids of the EPTFE film with a sufficient amount of the perfluoro-copolymer in one step and is economically advantageous. The pore size of the EPTFE film used as a substrate can be chosen in a wide range of 0.1 to 100 μm. The perfluoro-copolymer containing nonelectrolyte type functional groups which has been melted can be fused in a porous material to be strongly fixed therein. Therefore, in the impregnation with the dispersion composition of the present invention, the pore size is not limited. The average pore size of the substrate is correlated with the strength and void content of the substrate. Both void content and strength are preferably high. The EPTFE film as a substrate is chosen depending on its use and purpose. An EPTFE film having a small average pore size is preferable because it usually has high dimensional stability, thickness stability and strength, so that the specifications of the film can easily be determined for the film as original substrate. On the other hand, an EPTFE film having a large average pore size is advantageous in that the void content can be increased, so that the amount of the perfluoro-copolymer infiltrated into the voids can be increased. Moreover, it is advantageous also in that the strength and thickness of the produced EPTFE film impregnated with the perfluoro-copolymer can be controlled by uniaxial or biaxial stretching of this impregnated film. In view of these characteristics, the EPTFE film as substrate is properly chosen depending on its use and purpose.

In the fixation by heating under pressure, the solid structure of the perfluoro-copolymer (or the perfluoro-copolymer containing a fluoro-oligomer(s)) is formed simultaneously with the impregnation of the voids of the EPTFE film with said copolymer. When an EPTFE film having a large pore size and a high void content is chosen as the substrate, the substrate film is compressed and thereby decreased in thickness (in this case, the fluoro-oligomer(s) becomes liquid and is eliminated from EPTFE at the same time) simultaneously with the impregnation during the application of pressure in some cases. Therefore, the make-up and coating amount of the dispersion composition of the present invention are preferably determined depending on the desired content of the perfluoro-copolymer.

In the present inventive process for producing an EPTFE film containing a perfluoro-copolymer, the dispersion composition of the present invention is applied on an EPTFE film and heated at 160 to 340° C. under pressure to be fixed by the heating simultaneously with impregnation of the voids of EPTFE film with the perfluoro-copolymer. As the heating temperature, a temperature of 160° C. or higher is chosen from the viewpoint of the formation of a solid structure of the perfluoro-copolymer, and a temperature of 340° C. or lower is chosen from the viewpoint of the heat decomposability of the perfluoro-copolymer. When the thermal stability of the fluoro-oligomer(s) is low, the heating temperature is preferably 300° C. or lower and a sufficient measure against waste gas and a sufficient measure to prevent harm should be taken.

As a method for the application of pressure, a press shaping method, for example, is adopted. The dispersion composition is heated at 160 to 340° C. simultaneously with the application of pressure. More strictly, the dispersion composition is preferably heated from a low temperature of 160° C. or lower to a temperature of 160 to 340° C. under pressure. The reason is that when the dispersion composition is heated at 160 to 340° C. before applying pressure, a completely solid structure of the perfluoro-copolymer is formed, so that the impregnation of the voids of the polytetrafluoroethylene stretched porous film with the perfluoro-copolymer becomes difficult in some cases. The time required for the above-mentioned heating under pressure is not particularly limited.

The EPTFE film heat-treated under pressure contains the perfluoro-copolymer in its voids, and the liquid fluoro-oligomer(s) separated is eliminated from the EPTFE film. The fluoro-oligomer(s) is easily removed by washing and extraction with a fluorine-containing solvent usually at a temperature lower than the boiling point at ambient pressure of the fluorine-containing solvent. Then, the fluorine-containing solvent is removed by drying under pressure at a temperature of about 110° C. or lower. Subsequently, the thus treated EPTFE film is preferably heat-treated or hot-pressed at 160 to 340° C. in order to increase the adhesive strength among the perfluoro-copolymer portions contained in the voids of the EPTFE film and to accelerate the interaction between the polytetrafluoroethylene fiber as substrate and the perfluoro-copolymer to improve the adhesion between them. Since the fluoro-oligomer(s) itself is thermally and chemically stable, it may be remain in the perfluoro-copolymer.

In the production process of an impregnated film of the present invention, a multilayer structure can be formed in one step. In the above process, a thin film of a resin composed of a perfluoro-copolymer alone can be formed on the surface of an EPTFE film in one step simultaneously with the impregnation of the voids of the EPTFE film with the perfluoro-copolymer by applying a proper and excessive amount of the dispersion composition. In addition, by applying dispersion compositions containing perfluoro-copolymers, respectively, different in the form of functional groups contained, EW value and the like on the surfaces, respectively, of an EPTFE film, a multilayer structure can also be formed in which the boundary surface between the different copolymers is formed inside the porous material of EPTFE. In this case, the voids of the EPTFE film are impregnated with only the fluoro-oligomer(s) when the dispersion compositions are applied at a temperature of 160° C. or lower. Therefore, the copolymers are not randomly mixed in the direction of thickness of the film. On the other hand, on the boundary surface between the different copolymers inside the EPTFE film, a firm boundary layer can be formed by suitable contact and mixing of the copolymers having non-electrolyte type functional groups capable of permitting melt shaping. These characteristics suitable for forming a multilayer membrane composed of a large number of layers are based on the fact that the polymer structures of the perfluoro-copolymers contained in the dispersion compositions of the present invention are remarkably changed during impregnation with the dispersion compositions with heating at 160 to 340° C. under pressure, and the fact that owing to this change, the same firm structure as in the case of a single perfluoro-copolymer is formed. After substantially complete removal of the fluoro-oligomer(s) contained in the film by the use of a fluorine-containing solvent, the film is reheated at 160 to 340° C. under pressure if necessary, whereby the following excellent effects are brought about: the voids of the EPTFE stretched porous film can be substantially filled with the perfluoro-copolymers, and moreover, the above process can be applied to perfluoro-copolymers having EW and MI values in wide ranges.

When a film impregnated with a perfluoro-copolymer is produced by continuously using an EPTFE film of continuous length, there is adopted, for example, a process comprising applying the dispersion composition of the present invention by spray coating, screen printing or the like (the dispersion composition may be directly applied on an EPTFE film, or may be previously applied on a substrate film such as a polytetrafluoroethylene film, aluminum foil or the like), heating the resulting coated film under pressure by means of calendaring rolls or the like while holding the coated film between other substrate films if necessary, to impregnate the voids of the EPTFE film with the dispersion composition of the present invention, removing the fluoro-oligomer(s) by the use of a fluorine-containing solvent, drying the thus treated film, and then reheating the dried film under pressure by means of calendaring rolls or the like. In the production of the yarn of the present invention, the yarn to be used as raw yarn is produced after slitting and/or uniaxial stretching at 20 to 340° C. (and then the removal of the fluoro-oligomer(s)) carried out after the impregnation with the dispersion composition in the above first step or after the subsequent heating under pressure in the second step.

(More Detailed Description of the Invention)

In the fluorine-containing cation-exchange membrane (diaphragm for electrolysis or diaphragm for a fuel cell) or membrane-electrodes assembly obtained by the production process according to the present invention, there is formed the solid structure of the resin(s) that is still of a nonelectrolyte type (a $SO_2F$ type or $CO_2R^3$ type) which permits melting and strong joining. Therefore, the adhesive strength between resin portions of the perfluoro-copolymer or between the perfluoro-copolymer and the substrate membrane is very high. Accordingly, the membrane can retain its structure and performance characteristics even when used for a long period of time after the conversion of the nonelectrolyte type to an electrotype type (a Na type, H type or the like).

In order to explain the characteristics of the dispersion composition of the present invention in further detail, the mechanism, actions and the like of the present invention are explained below, but this explanation is not intended in any way to limit the scope of the present invention.

In order to develop a fluorine-containing cation-exchange membrane (diaphragm for electrolysis or diaphragm for a fuel cell) or membrane-electrodes assembly, which is composed of a large number of layers and has excellent functions, the present inventor conducted extensive studies and research on the production of a dispersion in which a nonelectrolyte type cation-exchange resin having repeating units represented by the above (formula 1) or (formula 4), another resin (other resins), solid particles and the like are finely dispersed and which is a useful material for producing said membrane or assembly. Consequently, it was found that homogeneous mixing and melt-kneading of the above components is very difficult after complete formation of a solid structure (a high-order structure such as a crystal structure), and that the causes of this difficulty are a high viscosity at the time of melting and the difficulty of destruction of the crystal structure which are due to the structure of the cation-exchange resin composed of a rigid and linear chain of a series of —$(CF_2)$— units.

In addition, there is almost no solvent capable of dissolving the nonelectrolyte type cation-exchange resin having repeating units represented by the above (formula 1) or (formula 4) unless the resin has a very low molecular weight. As a technique for solving such a problem, several techniques are known but all of them are very difficult to apply to a nonelectrolyte type cation-exchange resin having a high EW value and/or a high molecular weight which are required for practical purposes. Therefore, the range of their application is severely limited. It is conjectured that the cause of this difficulty is also the difficulty of destruction of the high-order structure (e.g. crystal structure) which is due to the rigid and linear chain of a series of —$(CF_2)$— units.

The present inventor investigated extensively in order to solve such problems, and consequently found that in the production of the nonelectrolyte type cation-exchange resin having repeating units represented by the above (formula 1) or (formula 4), the condition of the molecular chain which is the most suitable for the purpose can be realized by properly choosing a process and conditions of the production. Such a polymerization liquid composition, however, involves the following problems: the composition contains unreacted and residual vinyl monomers and a solvent for polymerization, and their removal results in easy formation of a firm structure; the firm structure once formed cannot be destroyed as described above; on the other hand, the composition containing these impurities is very difficult to use as a starting material because it is poor in thermal and chemical structural stability. Therefore, the composition is substantially difficult to use as a material for producing a fluorine-containing cation-exchange membrane. The present inventor further conducted earnest studies and researches in order to solve these problems, and consequently found that a desired starting material can be produced by adding a thermally and chemically very stable liquid fluoro-oligomer(s) to the polymerization liquid composition to replace contents other than the nonelectrolyte type cation-exchange resin of the polymerization liquid with the fluoro-oligomer(s), whereby the present invention has been accomplished.

The product obtained by the replacement, i.e., the dispersion composition of the present invention, can retain its stable state without the formation of a complete solid structure (a high-order structure such as a crystal structure) and has the characteristics described below. The present inventor found that various starting materials can very easily be produced owing to the characteristics described below.

All the characteristics are unique characteristics utterly different from those of the fluorine-containing cation-exchange resin which has a complete solid structure (a high-order structure such as a crystal structure) formed therein.

The characteristics of the present inventive dispersion composition comprising a perfluorocarbon-based copolymer containing nonelectrolyte type functional groups (hereinafter, perfluoro-copolymer) and a fluoro-oligomer(s) are described below. There are given examples of characteristics imparted when a copolymer having repeating units represented by the above (formula 4) wherein n=1, m=2 and p=4 to 10, and having a value of the melt index at 270° C. described below of approximately 2 to 40 (g/10 min) is used as the perfluoro-copolymer, and a hexafluoropropene oxide oligomer(s) (hereinafter, HFPO oligomer(s)) having repeating units shown in —$[CF(CF_3)$—$CF_2$—$O]_{q+r}$— is used as the fluoro-oligomer(s).

In such a dispersion composition, when the content of the HFPO oligomer(s) is more than about 70 wt %, the perfluoro-copolymer forms fine swollen particles with an average particle size of 100 μm or less stably solvated with the HFPO oligomer(s). When the excess HFPO oligomer(s) is present, a structure is formed in which the fine swollen particles are dispersed in the HFPO oligomer(s). The fine swollen particles can be extracted in the form of stable swollen particles, for example, by removing the excess HFPO oligomer(s) by filtration under reduced pressure. The swollen particles have a whitely turbid, pasty (gel-like) form. By contrast, when the perfluoro-copolymer after complete formation of a solid structure therein is dispersed in the HFPO oligomer(s), it does not give the same swollen composition as above at any temperature of 0 to 150° C. and shows a state in which transparent or semitransparent particles are merely dispersed. On the other hand, when heated at a high temperature of 180° C. or higher, said copolymer was merely melted as in the case where the copolymer was heated alone.

The perfluoro-copolymer contained in the above-mentioned dispersion composition has no complete solid structure (a high-order structure such as a crystal structure) formed therein, and has a crystallinity of not more than about one-half that of a corresponding copolymer having a complete solid structure formed therein (dissolved in the HFPO oligomer(s) to the same concentration), for example, when the crystallinity is calculated by adopting a wide-angle X-ray diffraction method. This fact is in contrast to the fact that such a marked decrease in crystallinity is not observed even when the perfluoro-copolymer containing nonelectrolyte type functional groups and having a complete solid structure formed therein is rapidly cooled after melting with heating.

That is, it can be said that in the above-mentioned dispersion composition, the molecular chain of the perfluoro-copolymer forms swollen fine particles solvated with the HFPO oligomer(s) and is stably present while being in an amorphous state or having an incomplete solid structure. This is supported with the following other characteristic. For example, when solid NMR with $^{19}F$ is measured in the HFPO oligomer(s) at a low temperature (25° C.) by a MAS method, the copolymer having a complete solid structure formed therein gives broad signals due to the perfluoro-copolymer, while the copolymer contained in the above-mentioned dispersion composition gives sharp signals.

When a fluorine-containing solvent such as CFC113 is added to the above-mentioned dispersion composition (the additive amount is approximately 2 to 5 times the weight of the dispersion composition), a very transparent and homogeneous solution-like material or a very remarkably swollen gel-like material is rapidly formed at room temperature. On the other hand, when the fluorine-containing solvent is added to the perfluoro-copolymer having a complete solid structure formed therein, this copolymer was hardly swollen and remained powdery. The copolymer having a complete solid structure formed therein gives exactly the same result as above even when the copolymer comprises fine particles passable through a 400-mesh screen. Thus, the above difference in characteris-tics is not dependent on the difference in particle size. In addition, the above-mentioned solution-like material or remarkably swollen gel-like material formed by the addition of the fluorine-containing solvent to the above-mentioned dispersion composition can be reversibly converted to the original whitely turbid, pasty (gel-like) dispersion composition by removing the fluorine-containing solvent. The characteristics described above of the above-mentioned dispersion composition can be plainly expressed in the words "whitely turbid".

These characteristics are especially remarkable in the case of a dispersion composition in which the content of the HFPO oligomer(s) is 200 parts by weight or more per 100 parts by weight of the perfluoro-copolymer. Such a dispersion composition is very excellent in structural stability. Also in the case of a dispersion composition (in a whitely turbid, pasty state or a whitely turbid, powdery state) in which the content of the HFPO oligomer(s) is 10 to 200 parts by weight per 100 parts by weight of the perfluoro-copolymer, the difference from the copolymer having a complete solid structure formed therein was observed quite similarly.

More surprisingly, the above-mentioned characteristics were not deteriorated in the aforesaid dispersion composition even when the perfluoro-copolymer (~$CO_2CH_3$ type or ~$SO_2F$ type) constituting the composition has a very high EW value of 1500 (MI is approximately 2 to 20).

That is, as the perfluoro-copolymer that constitutes the dispersion composition of the present invention, perfluoro-copolymers having an EW value and a molecular weight in very wide ranges, respectively, can be used with almost no restriction, so that various dispersion compositions can be provided as a material for producing a fluorine-containing cation-exchange membrane. This fact overcomes great restrictions on the EW and molecular weight (restrictions on the production of a polymer solution) in conventional techniques such as a technique in which impregnation and fixation are carried out by the use of a solution of a $SO_3H$ type perfluoro-copolymer. Therefore, this fact is a remarkable characteristic and advantage.

In the dispersion composition of the present invention, the molecular weight distribution and EW distribution of the perfluoro-copolymer can be made sharper by fractionating the composition, for example, by separation by filtration after the addition of a fluorine-containing solvent, or fractionating the composition by filtration after heating the composition at a temperature of 150° C. or lower to reduce the size of dispersed particles. This method is effective, for example, when the dispersion composition is used in the case where low-molecular weight matters have an undesirable influence on the functions of the membrane. For this purpose, there is suitably used a dispersion composition comprising 100 parts by weight of the perfluoro-copolymer and 200 to 10,000 parts by weight of the fluoro-oligomer(s), which are most stably and finely dispersed.

The dispersion composition of the present invention is mixed and kneaded with solid particles of various kinds and then the fluoro-oligomer(s) is removed, whereby a solid-particle dispersion composition can be formed in which the perfluoro-copolymer and the solid particles are very homogeneously dispersed. The solid-particle dispersion composition obtained has a structure having a characteristic not observed in the case of a perfluoro-copolymer having a complete solid structure formed therein which is characterized only by having a small particle size. That is, the structure is, for example, a structure in which the solid particles are coated with the perfluoro-copolymer, or a structure in which the solid particles and the perfluoro-copolymer are finely dispersed. Such a structure is based on the above-mentioned unique characteristics of the dispersion composition as original starting material. Accordingly, coating of a membrane with a thin layer becomes easily realizable which has been achievable only by the use of a dispersion consisting of a perfluoro-copolymer solution and solid particles.

Thus, the dispersion composition of the present invention is a very useful material for producing a fluorine-containing cation-exchange membrane or the like, and a diaphragm for electrolysis, a diaphragm for a fuel cell, and a membrane-electrodes assembly which are produced by using said dispersion composition, and can exhibit excellent performance characteristics and functions, which have been unattainable.

By a well-known and generally used method, the dispersion composition of the present invention can be melt-shaped alone into pellets or a film, in which the perfluoro-copolymer and the fluoro-oligomer(s) (and the solid particles) are homogeneously dispersed. Thus, the dispersion composition of the present invention can be variously utilized depending on its use and purpose.

Furthermore, employment of the dispersion composition of the present invention permits impregnation of the voids of an EPTFE film with the perfluoro-copolymer having non-electrolyte type functional groups and fixation of the copolymer in the voids, and the resulting film has a firm structure because of a very high adhesive strength between resin portions of the perfluoro-copolymer and can have very high structural stability and performance stability also after the conversion of the functional groups to electrolyte type functional groups, compared with a film impregnated with a perfluoro-copolymer containing electrolyte type functional groups which is produced by a conventional technique. The surprising fact that even when the pore size of the EPTFE film used as a substrate is 0.1 μm, the voids of the film can easily be impregnated with the perfluoro-copolymer, also indicates that the dispersion composition of the present invention is a useful raw material which can be substituted for a conventional polymer solution. It is conjectured that the above impregnation is the result of the following: during the heating at 160 to 340° C., a very finely dispersed state is brought about which is very similar to a solution of the perfluoro-copolymer, after which the inherent solid structure of the perfluoro-copolymer is irreversibly formed. It can be said that the above fact indicates the unique characteristic of the dispersion composition of the present invention.

In the above explanation, in order to elucidate the characteristics and effects of the dispersion composition of the present invention, there is described only employment of the composition in the production process of a fluorine-containing cation-exchange membrane as a diaphragm for sodium chloride electrolysis, a diaphragm for a fuel cell or a membrane-electrodes assembly, though the use of the dispersion composition of the present invention is not limited to such a use.

The present invention is illustrated in further detail with reference to the following examples, which should not be construed as limiting the scope of the invention.

EW and MI (melt index) of a perfluoro-copolymer, the average particle size of dispersed particles in a dispersion composition of a perfluoro-copolymer and a fluoro-oligomer(s), the particle size of solid particles, the rate of peeling of a solid-particle coating layer, and the rate of extraction of a perfluoro-copolymer containing $SO_3H$ type functional groups in the Examples and Comparative Examples, and the current efficiency in use examples were individually determined as follows.

As to all the perfluoro-copolymers, inclusive of those in substrate membranes, in the description given below, a sulfonic acid type perfluoro-copolymer refers to that having repeating units: $-[CF_2CF_2]_p-[CF_2CF(-O-CF_2CF(CF_3)-O-CF_2CF_2-SO_2F)]-$, and a carboxylic acid type perfluoro-copolymer refers to that having repeating units: $-[CF_2CF_2]_p-[CF_2CF(-O-CF_2CF(CF_3)-O-CF_2CF_2-CO_2CH_3)]-$. Unless otherwise specified, both of them are copolymers having nonelectrolyte type functional groups.

The following EW and melt index of a perfluoro-copolymer contained in a dispersion composition of the perfluoro-copolymer and a fluoro-oligomer(s), and the content of the perfluoro-copolymer are measured after removing the excess fluoro-oligomer(s) if necessary, heating the residual dispersion composition at 240° C. for 5 minutes to form the solid structure of the perfluoro-copolymer, removing the residual fluoro-oligomer(s) by extraction while refluxing $CF_3CHFCHFCF_2CF_3$ (HFC43-10mee), and then drying the residue at 90° C. under reduced pressure for 16 hours or more.

(1) "EW" of a perfluoro-copolymer was measured as follows.

The perfluoro-copolymer was made into a film of about 200 μm in thickness by press shaping and the film was accurately weighed. This weight was taken as $W_1$ (g). Then, the film was treated with a mixed solution of a 3N aqueous cesium hydroxide solution and 50 vol % methanol at 60° C. for 16 hours or more to be converted to a complete cesium salt type. Subsequently, the film was taken out, and washed with running water at room temperature for 30 minutes or more and then with ion-exchanged water at 90° C. for 12 hours or more (replacement with fresh ion-exchanged water was repeated 5 times or more) to remove the Donnan salt in the film completely. The film was taken out, dried under reduced pressure at 150° C. for 16 hours or more, and then completely dried at room temperature for 3 days or more in a desiccator containing phosphorus pentaoxide until no weight loss was caused. The film thus treated was accurately weighed and its weight was taken as $W_2$ (g). From $W_1$ (g) and $W_2$ (g) thus measured, EW (equivalent weight) [g-perfluoro-copolymer/eq-nonelectrolyte type functional group] of the sulfonic acid type perfluoro-copolymer or the carboxylic acid type perfluoro-copolymer was calculated according to the following equation (1) or (2), respectively:

EW of the sulfonic acid type perfluoro-copolymer:

$$EW=(129.906)(W_1)/(W_2-W_1) \quad (1)$$

EW of the carboxylic acid type perfluoro-copolymer:

$$EW=(117.870)(W_1)/(W_2-W_1) \quad (2)$$

(2) "MI (melt index)" of a perfluoro-copolymer was measured with a Meltindexer Model S-01 manufactured by Toyo Seiki Seisaku-sho Co., Ltd., and was expressed in terms of the weight (g/10 min) (a converted value per 10 minutes) of the perfluoro-copolymer allowed to flow out in 10 minutes through an orifice with an inside diameter of 2.09 mm and a length of 8 mm at 270° C. under a load of 2.16 kgf (21.2N). The value of the melt index is an indication of the molecular weight of the perfluoro-copolymer.

(3) The "average particle size of dispersed particles" in a dispersion composition of a perfluoro-copolymer and a fluoro-oligomer(s) was calculated after measurement with a Shimadzu laser diffraction type particle size distribution measuring apparatus SALD-2000J by the use of a dilution prepared by diluting the dispersion sufficiently with the fluoro-oligomer(s) so that the content of the perfluoro-copolymer is about 0.1 wt %.

(4) The "particle size" of solid particles or the "particle size" of a powdery material was measured for powder, and was calculated from the weights of the components of the powder separated by the use of screens having a mesh diameter of 2000, 1000, 710, 500, 355, 250, 125 or 75 μm, respectively. The "particle size" was expressed in terms of the percentages by weight of the powder components passable through these screens.

(5) The "rate of peeling of solid-particle coating layer" of a membrane having a perfluoro-copolymer layer containing solid particles dispersed therein which is formed on a fluorine-containing cation-exchange membrane was measured by the following treatment.

A membrane after the conversion of functional groups originally contained therein to electrolyte type (e.g. $CO_2Na$ type or $SO_3Na$ type) functional groups (a membrane in a form usually put to practical use) was washed with running water, dried under reduced pressure at 90° C. for 1 hour, and then made into a test piece. For the test piece, the intensity of a peak due to solid particles of interest was measured with a fluorescent X-ray analysis apparatus, and the count in this case was taken as $N_1$. Then, this membrane or a membrane equal thereto (after being placed in a bag of polyethylene net or fixed in the four directions, so as not to be crumpled) was immersed in a mixed solution of water/ethanol=50/50 by volume (=56/44 by weight) under reflux for 30 minutes. In this case, as to the ratio between the membrane and the solution, the weight of the mixed solution was not less than 20 times that of the membrane, and it was necessary to immerse the membrane completely in the solution. Subsequently, the membrane was taken out, thoroughly washed with running water at room temperature, and then dried under reduced pressure at 90° C. for 1 hour. For the dried film, the intensity of a peak due to the solid particles of interest was measured with the same fluorescent X-ray analysis apparatus as above, and the count in this case was taken as $N_2$. The above two measurements were carried out also for a standard sample having a known content of the solid particles of interest, and on the basis of a count change caused in this case, a $N_2$ value obtained by the correction (proportional correction) of a measured value was used. From the counts $N_1$ and $N_2$ obtained by the above measurements, the "rate of peeling P (%) of solid-particle coating layer" was calculated by the following equation:

$$P(\%)=\{(N_1-N_2)/N_1\}\times 100$$

(6) The "rate of extraction of a perfluoro-copolymer containing $SO_3H$ type functional groups" in an EPTFE film impregnated with the perfluoro-copolymer containing $SO_3H$ type functional groups was measured by the following treatment.

Previously, the weight (W3) of an EPTFE film used as a substrate was accurately measured. The weight of this test piece was adjusted to 1 g or less. At first, the EPTFE film which had been impregnated with a perfluoro-copolymer containing SO3H type functional groups of interest was treated with 1N hydrochloric acid or 1N sulfuric acid at 90° C. for 8 hours. Then, the impregnated EPTFE film was thoroughly washed with running water, air-dried and then dried under reduced pressure at 110° C. for 8 hours, after which its weight (W4) was immediately measured. This specimen was placed in a test tube with a diameter φ of 28 mm and a height of 200 mm, and 60 milliliters (a sufficiently large volume for the specimen) of a mixed solution of water/ethanol=50/50 by volume (=56/44 by weight) was placed in the test tube. This test tube was charged into a 5-liters autoclave and about 2 liters of a mixed solution of water/ethanol=50/50 by volume was placed outside (inside the autoclave) said test tube. This mixed solution was heated until the internal temperature of the autoclave reached 120° C., and this heat-treatment was still continued for 4 hours after the internal temperature had reached 120° C. Then, the mixed solution was cooled to room temperature. Each of the step of heating from room temperature to 120° C. and the step of cooling from 120° C. to room temperature required about 2 hours. After the heat treatment, the specimen was taken out of the test tube in the autoclave and thoroughly washed with a mixed solution of water/ethanol=50/50 by volume at room temperature. The washed specimen was dried under reduced pressure at 110° C. or 8 hours, after which its weight (W5) was immediately measured. From the thus obtained weight values W3, W4 and W5, the rate of extraction E (wt %) of the functional-group-containing perfluoro-copolymer was determined as follows. When the polytetrafluoroethylene content of the specimen was not known, the specimen was dissolved with heating at a high temperature of 240° C. or higher to dissolve and peel off the whole perfluorocarbon resin containing SO3H type functional groups and contained in the specimen, and then was dried under reduced pressure at 110° C. for 8 hours, after which its weight was accurately measured and was taken as W3. The complete taking-off of the resin was confirmed by quantitating the residual functional groups by IR or the like.

$E(\text{wt \%}) = \{1-(W5-W3)/(W4\cdot W3)\} \times 100$ (7) The "current efficiency" of a membrane was measured by carrying out the following electrolysis.

In a small electrolytic bath with an effective membrane area of 1 dm² and a distance between electrodes of 2 mm, the fluorine-containing cation-exchange membrane described in each working example was set with its carboxylic acid layer facing towards the cathode compartment, and an aqueous sodium chloride solution (200 g/liter) was fed to the anode compartment. Electrolysis was carried out at a current density of 40 A/dm² and a temperature of 90° C. while adjusting the sodium hydroxide concentration at the outlet of the cathode compartment to 30.5 wt %. The current efficiency (%) was calculated by measuring the amount of an aqueous sodium hydroxide solution produced on the cathode compartment side by the electrolysis.

The present invention is explained below with reference to examples.

EXAMPLE 1

Into a 1-liter stainless-steel autoclave were charged 580 g of $CF_2Cl$—$CFCl_2$, 280 g of $CF_2$=$CF$—$O$—$CF_2CF(CF_3)$—$O$—$CF_2CF_2$—$SO_2F$ and 0.02 g of methanol as molecular weight regulator, after which the autoclave was purged with nitrogen and then tetrafluoroethylene (TFE, $CF_2$=$CF_2$). After the temperature was adjusted to 25° C. and the pressure of TFE to 0.165 MPa-G (gauge pressure), 7 g of a $CF_2Cl$—$CFCl_2$ solution containing 5 wt % of (n-$C_3F_7COO$—)$_2$ was added and the resulting mixture was subjected to polymerization. The polymerization was carried out for 7 hours while feeding TFE intermittently from the outside of the system in the polymerization vessel and reducing the TFE pressure from the initial value of 0.165 MPa-G to a final value of 0.142 MPa-G. After the TFE in the system in the polymerization vessel was replaced with nitrogen to adjust the internal pressure to atmospheric pressure, a polymerization liquid composition was obtained. The polymerization liquid composition had a viscosity of 4 g/cm/sec and was a transparent jelly-like liquid.

To the polymerization liquid composition was added 1200 g of Krytox 143AD (Lot-162) manufactured by E.I. du Pont de Nemours & Co. (which was a hexafluoropropene oxide oligomer having a structure —[$CF(CF_3)$—$CF_2$—$O$—]$_r$— and was a liquid having a kinematic viscosity at 38° C. of 4.95 cm²/sec) at room temperature, followed by mixing and stirring. Owing to the mixing and stirring, the polymerization liquid composition became whitely turbid. Subsequently, to the dispersion thus obtained was added 1 liter of n-hexane at room temperature, and they were mixed and stirred, and then allowed to stand to be separated into two layers, i.e., a colorless and transparent upper layer and a whitely turbid lower layer. The whitely turbid lower layer was taken out, repeatedly washed 5 times with 1 liter of n-hexane at room temperature, and then dried under reduced pressure at 90° C. for 48 hours to remove low-boiling compounds, whereby 1260 g of a whitely turbid, pasty (gel-like) dispersion composition was obtained. A sulfonic acid type perfluoro-copolymer contained in the dispersion composition had an EW value of 955 and a MI value of 22. The dispersion composition was allowed to stand for 1 week to be separated into two layers, i.e., a colorless and transparent upper layer and a whitely turbid, pasty (gel-like) precipitate.

The excess Krytox 143AD was removed from the dispersion composition by filtration under reduced pressure at room temperature to obtain a pasty dispersion composition. The average particle size of dispersed particles in this dispersion composition was 63 μm. The content of the sulfonic acid type perfluoro-copolymer in this dispersion composition was 32 wt %. Wide-angle X-rays were measured for the dispersion composition containing 32 wt % of the copolymer, and the crystallinity $\chi_c$ was calculated from the area ratio between a peak due to —$(CF_2)_n$— crystals and a peak due to an amorphous state which were at such a distance from each other that 2θ in the chart obtained was 17.5°. As a result, it was found that $\chi_c$=4.8%. When $CF_2Cl$—$CFCl_2$ was added to the aforesaid dispersion composition (copolymer concentration: 32 wt %) in a volume of 3 times that of the composition, the composition rapidly gave a remarkably swollen transparent gel-like material. When the same dispersion composition as above was treated in the same manner as above except for using $CF_3CHFCHFCF_2CF_3$ in place of $CF_2Cl$—$CFCl_2$, the composition gave a milk-whitely turbid, homogeneous dispersion. From the thus formed liquids, $CF_2Cl$—$CFCl_2$ or $CF_3CHFCHFCF_2CF_3$, respectively, was removed to find that the liquids returned to their original forms, i.e., the whitely turbid dispersion compositions.

COMPARATIVE EXAMPLE 1

Exactly the same polymerization as in Example 1 was carried out to obtain a polymerization liquid composition. To the polymerization liquid composition was added 2 liters of n-hexane at room temperature to precipitate a solid polymer, and the supernatant was removed, after which the precipitate was repeatedly washed 5 times with 2 liters of n-hexane. The resulting powder was dried under reduced pressure at 90° C. for 16 hours to obtain 61.2 g of powder of a sulfonic acid type perfluoro-copolymer having a complete structure formed therein.

This copolymer had an EW value of 960 and a MI value of 18. For the obtained powder, the crystallinity $\chi_c$ was measured in the same manner as in Example 1 by using the powder as it was, to find that $\chi_c$=13.5%. To 10 g of the powder was added 21 g of Krytox 143AD (Lot-162) manufactured by E.I. du Pont de Nemours & Co., at room temperature, and they were mixed and stirred to find that particles of the powder were in a transparent or semi-transparent state and were hardly swollen. For the resulting dispersion, the crystallinity $\chi_c$ was calculated in the same manner as in Example 1 to obtain a $\chi_c$ value of 6.0%. This value was higher than the value (=4.5%) obtained for the dispersion composition of Example 1. Even when the dispersion was heated at 130° C. for 16 hours, its state during heating and that after cooling were exactly the same, namely, its state was not changed. Also when $CF_2Cl—CFCl_2$ or $CF_3CHFCHFCF_2CF_3$ was added to the dispersion, followed by mixing and stirring, the same result as above was obtained except that slight swelling was observed.

The powder obtained above formed large particles by partial adhesion. When the powder was separated by the use of a 10-mesh screen, about one-third of the powder did not pass through the screen and remained on the screen. For the rest, i.e., the about two-thirds of the copolymer which had passed through the screen, the particle size was measured by the sieving method and found to be as follows; 710 μm or less: 100%, 500 μm or less: 98.4%, 355 μm or less: 56.5%, 250 μm or less: 26.2%, 125 μm or less: 2.6%, and 75 μm or less: 0.1%. In a dispersion prepared by adding Krytox 143AD to the powder obtained above, the "average particle size of dispersed particles" could not be measured with a laser diffraction type particle size distribution measuring apparatus because the particle size was too large.

EXAMPLE 2

Into a 1-liter stainless-steel autoclave were charged 550 g of $CF_2Cl—CFCl_2$, 265 g of $CF_2=CF—O—CF_2CF(CF_3)—O—CF_2CF_2—CO_2CH_3$ and 0.06 g of methanol as molecular weight regulator, after which the autoclave was purged with nitrogen and then tetrafluoroethylene (TFE, $CF_2=CF_2$). After the temperature was adjusted to 25° C. and the pressure of TFE to 0.258 MPa-G, 4.5 g of a $CF_2Cl—CFCl_2$ solution containing 5 wt % of $(n-C_3F_7COO—)_2$ was added and the resulting mixture was subjected to polymerization. The polymerization was carried out for 2.5 hours while feeding TFE intermittently from the outside of the system in the polymerization vessel and reducing the TFE pressure from the initial value of 0.258 MPa-G to a final value of 0.238 MPa-G. After the TFE in the system in the polymerization vessel was replaced with nitrogen to adjust the internal pressure to atmospheric pressure, a polymerization liquid composition was obtained. The polymerization liquid composition had a viscosity of 2 g/cm/sec and was a transparent jelly-like liquid.

To the polymerization liquid composition was added 900 g of Krytox 143AD (Lot-162) manufactured by E.I. du Pont de Nemours & Co., at room temperature, followed by mixing and stirring. Owing to the mixing and stirring, the polymerization liquid composition became whitely turbid. Subsequently, to the dispersion thus obtained was added 1 liter of n-hexane at room temperature, and they were mixed and stirred, and then allowed to stand to be separated into two layers, i.e., a colorless and transparent upper layer and a whitely turbid lower layer. The whitely turbid lower layer was taken out, repeatedly washed 5 times with 1 liter of n-hexane at room temperature, and then dried under reduced pressure at 90° C. for 48 hours to remove low-boiling compounds, whereby 945 g of a whitely turbid, pasty (gel-like) dispersion composition was obtained. A carboxylic acid type perfluoro-copolymer contained in the dispersion composition had an EW value of 1210 and a MI value of 8. The dispersion composition was allowed to stand for 1 week to be separated into two layers, i.e., a colorless and transparent upper layer and a whitely turbid, pasty (gel-like) precipitate.

The excess Krytox 143AD was removed from the dispersion composition at room temperature to obtain a pasty dispersion composition. The average particle size of dispersed particles in this dispersion composition was 26 μm. The content of the carboxylic acid type perfluoro-copolymer in this dispersion composition was 29 wt %. For the dispersion composition containing 29 wt % of the copolymer, the crystallinity $\chi_c$ was calculated in the same manner as in Example 1 to find that $\chi_c$=5.5%. When $CF_2Cl—CFCl_2$ was added to the aforesaid dispersion composition (copolymer concentration: 29 wt %) in a volume of 3 times that of the composition, the composition rapidly gave a remarkably swollen transparent gel-like material. When the same dispersion composition as above was treated in the same manner as above except for using $CF_3CHFCHFCF_2CF_3$ in place of $CF_2Cl—CFCl_2$, the composition gave a milk-whitely turbid, homogeneous dispersion. From the thus formed liquids, $CF_2Cl—CFCl_2$ or $CF_3CHFCHFCF_2CF_3$, respectively, was removed to find that the liquids returned to their original forms, i.e., the whitely turbid dispersion compositions.

COMPARATIVE EXAMPLE 2

Exactly the same polymerization as in Example 2 was carried out to obtain a polymerization liquid composition. To the polymerization liquid composition was added 2 liters of n-hexane at room temperature to precipitate a solid polymer, and the supernatant was removed, after which the precipitate was repeatedly washed 5 times with 2 liters of n-hexane. The resulting powder was dried under reduced pressure at 90° C. for 16 hours to obtain 46.3 g of powder of a carboxylic acid type perfluoro-copolymer having a completely solid structure formed therein.

This copolymer had an EW value of 1200 and a MI value of 6. For the obtained powder, the crystallinity $\chi_c$ was measured in the same manner as in Example 1 by using the powder as it was, to find that $\chi_c$=22.0%. To 10 g of the powder was added 24.5 g of Krytox 143AD (Lot-162) manufactured by E.I. du Pont de Nemours & Co., at room temperature, and they were mixed and stirred to find that particles of the powder were in a transparent or semi-transparent state and were hardly swollen. For the resulting dispersion, the crystallinity $\chi_c$ was calculated in the same manner as in Example 1 to obtain a $\chi_c$ value of 13.2%. This value was higher than the value (=5.5%) obtained for the dispersion composition of Example 2. Even when the dispersion was heated at 130° C. for 16 hours, its state during heating and that after cooling were exactly the same, namely, its state was not changed. Also when $CF_2Cl—CFCl_2$ or $CF_3CHFCHFCF_2CF_3$ was added to the dispersion, followed by mixing and stirring, the same result as above was obtained except that slight swelling was observed.

For the powder obtained above, the particle size was measured by the sieving method and found to be as follows; 710 µm or less: 100%, 500 µm or less: 99.2%, 355 µm or less: 65.8%, 250 µm or less: 38.1%, 125 µm or less: 7.3%, and 75 µm or less: 1.2%. In a dispersion prepared by adding Krytox 143AD to the powder obtained above, the "average particle size of dispersed particles" could not be measured with a laser diffraction type particle size distribution measuring apparatus because the particle size was too large.

EXAMPLE 3

Into a 1-liter stainless-steel autoclave were charged 550 g of $CF_2Cl$—$CFCl_2$, 265 g of $CF_2$=$CF$—$O$—$CF_2CF(CF_3)$—$O$—$CF_2CF_2$—$CO_2CH_3$ and 0.13 g of methanol as molecular weight regulator, after which the autoclave was purged with nitrogen and then tetrafluoroethylene (TFE, $CF_2$=$CF_2$). After the temperature was adjusted to 25° C. and the pressure of TFE to 0.303 MPa-G, 4 g of a $CF_2Cl$—$CFCl_2$ solution containing 5 wt % of $(n-C_3F_7COO-)_2$ was added and the resulting mixture was subjected to polymerization. The polymerization was carried out for 1.5 hours while feeding TFE intermittently from the outside of the system in the polymerization vessel and reducing the TFE pressure from the initial value of 0.303 MPa-G to a final value of 0.288 MPa-G. After the TFE in the system in the polymerization vessel was replaced with nitrogen to adjust the internal pressure to atmospheric pressure, a polymerization liquid composition was obtained. The polymerization liquid composition had a viscosity of 1 g/cm/sec and was a slightly turbid, semi-transparent and jelly-like liquid.

To the polymerization liquid composition was added 740 g of Krytox 143AY (Lot-406) manufactured by E.I. du Pont de Nemours & Co. (which was a hexafluoropropene oxide oligomer having a structure —[CF(CF_3)—CF_2—O—]_n— and was a liquid having a kinematic viscosity at 38° C. of 0.55 cm²/sec) at room temperature, followed by mixing and stirring. Owing to the mixing and stirring, the polymerization liquid composition became whitely turbid. Subsequently, to the dispersion thus obtained was added 1 liter of n-hexane at room temperature, and they were mixed and stirred, and then allowed to stand to be separated into two layers, i.e., a colorless and transparent upper layer and a whitely turbid lower layer. The whitely turbid lower layer was taken out, repeatedly washed 5 times with 1 liter of n-hexane at room temperature, and then dried under reduced pressure at 90° C. for 48 hours to remove low-boiling compounds, whereby 778 g of a whitely turbid, pasty dispersion composition was obtained. A carboxylic acid type perfluoro-copolymer contained in the dispersion composition had an EW value of 1480 and a MI value of 3.

To 0.9 g of the obtained dispersion composition was added 0.1 g of zirconium oxide ($ZrO_2$) powder having a primary-particle size of 0.02 µm, and they were mixed and kneaded in an agate mortar at room temperature to produce a pasty material. The pasty material was applied on a 50-µm thick film of a carboxylic acid type perfluoro-copolymer having an EW value of 1200, in an amount of 6 mg/cm², and then the film was placed with its coated side upward and the reverse side put on porous paper. The pasty material was fixed by heating at 240° C. for 2 minutes with sucking under reduced pressure from under the porous paper. The resulting film was washed with HFC43-10mee and then dried under reduced pressure at 90° C. for 4 hours. The amount of the coating layer thus formed was 0.1 mg/cm². This film was subjected to re-fixation at 240° C. for 2 minutes in the same manner as above.

Subsequently, the resulting film was hydrolyzed at 95° C. for 2 hours in an aqueous solution containing 30 wt % of KOH and 5 wt % of dimethyl sulfoxide, to convert the functional groups of the copolymer to potassium salt type functional groups. Then, the potassium salt type functional groups were converted to sodium salt type functional groups by treatment with a 0.1N aqueous sodium hydroxide solution at 90° C. for 1 hour. The "rate of peeling" of the $ZrO_2$ particle layer in the film thus obtained was measured and found to be less than 5%. The $ZrO_2$ particle layer was not taken off at all. When the re-fixation by heating was not carried out in the above, the "rate of peeling" was 45%.

EXAMPLE 4

The same treatment as in Example 3 was carried out except for changing the amount of Krytox 143AY added to 150 g, to obtain 189 g of a whitely turbid, very viscous and pasty dispersion composition. A carboxylic acid type perfluoro-copolymer contained in the dispersion composition had an EW value of 1470 and a MI value of 6.

A pasty material was produced from 0.4 g of the obtained dispersion composition and 0.1 g of zirconium oxide powder in the same manner as in Example 3, and a $ZrO_2$ particle dispersion composition layer was formed on a film in the same manner as in Example 3. This coating layer was formed in an amount of 0.15 mg/cm² by application of the starting paste in an amount of 1.5 mg/cm². The film was subjected to conversion to sodium salt type functional groups in the same manner as in Example 3, after which the "rate of peeling" of the $ZrO_2$ particle layer in the film was measured and found to be less than 5%. The $ZrO_2$ particle layer was not taken off at all.

EXAMPLE 5

The same treatment as in Example 3 was carried out except for changing the amount of Krytox 143AY added to 40 g, to obtain 78 g of a whitely turbid, viscous and pasty dispersion composition. A carboxylic acid type perfluoro-copolymer contained in the dispersion composition had an EW value of 1490 and a MI value of 4.

The pasty dispersion composition was press-shaped at 200° C. and a pressure of 10 MPa to obtain a homogeneously and whitely turbid film of the dispersion composition. The film was washed by immersion in HFC43-10mee with shaking (replacement with fresh HFC43-10mee: twice) to remove the Krytox 143AY contained in the film, and then was dried under reduced pressure at 90° C. for 4 hours to obtain a porous film of about 30 µm in thickness having pores homogeneously dispersed therein.

EXAMPLE 6

The same treatment as in Example 3 was carried out except for changing the amount of Krytox 143AY added to 16 g, to obtain 53 g of a whitely turbid, powdery dispersion composition. A carboxylic acid type perfluoro-copolymer contained in the dispersion composition had an EW value of 1510 and a MI value of 2.

The powdery dispersion composition was press-shaped at 200° C. and a pressure of 10 MPa to obtain a homogeneously and whitely turbid film of the dispersion composition. The film was washed by immersion in HFC43-10mee with shaking (replacement with fresh HFC43-10mee: twice) to remove the Krytox 143AY contained in the film, and then was dried under reduced pressure at 90° C. for 4 hours to obtain a porous film of about 25 μm in thickness having pores homogeneously dispersed therein.

EXAMPLE 7

The same treatment as in Example 3 was carried out except for changing the amount of Krytox 143AY added to 4 g, to obtain 42 g of a whitely turbid, powdery dispersion composition. A carboxylic acid type perfluoro-copolymer contained in the dispersion composition had an EW value of 1460 and a MI value of 12.

The powdery dispersion composition was press-shaped at 200° C. and a pressure of 10 MPa to obtain a whitely turbid, homogeneous film of the dispersion composition. The film was washed by immersion in HFC43-10mee with shaking (replacement with fresh HFC43-10mee: twice) to remove the Krytox 143AY contained in the film, and then was dried under reduced pressure at 90° C. for 4 hours to obtain a porous film of about 25 μm in thickness having pores homogeneously dispersed therein.

COMPARATIVE EXAMPLE 3

Exactly the same polymerization as in Example 3 was carried out to obtain a polymerization liquid composition. To the polymerization liquid composition was added 2 liters of n-hexane at room temperature to precipitate a solid polymer, and the supernatant was removed, after which the precipitate was repeatedly washed 5 times with 2 liters of n-hexane. The resulting powder was dried under reduced pressure at 90° C. for 16 hours to obtain 37.4 g of powder of a carboxylic acid type perfluoro-copolymer having a completely solid structure formed therein. This copolymer had an EW value of 1480 and a MI value of 2.

Dispersions containing five different concentrations (10, 30, 50, 70 and 90 wt %) of the carboxylic acid type perfluoro-copolymer were prepared by adding Krytox 143AY (Lot-406) manufactured by E.I. du Pont de Nemours & Co. to the powder (namely, by adding 45 g, 12 g, 5 g, 2.1 g or 0.6 g, respectively, of Krytox 143AY to 5 g of the carboxylic acid type perfluoro-copolymer having a completely solid structure formed therein). At room temperature, the copolymer and Krytox 143AY were not miscible at all in any of the dispersions, and were in a state in which a semitransparent powder of the copolymer was precipitated or merely dispersed (in the case of fine particles), or a state in which the powder was wetted with oil. All the dispersions were in such a condition in exactly the same manner, irrespective of the concentration of the carboxylic acid type perfluoro-copolymer. Subsequently, for each of the dispersions containing three different concentrations (50, 70 and 90 wt %) of the carboxylic acid type perfluoro-copolymer, an attempt was made to mix and knead the components of the dispersion by melting at each of two temperatures of 200° C. and 240° C., but there were formed large spots of 1 to 10 mm or more (spots due to transparent or semitransparent resin portions and transparent oil portions) which could be visually and easily observed, so that no structure could be formed in which a homogeneous dispersion had been achieved.

EXAMPLE 8

To 6.5 g of the dispersion composition produced in Example 1, i.e., the dispersion composition consisting of the sulfonic acid type perfluoro-copolymer having an EW value of 955 and a MI value of 22 (32 wt %) and Krytox 143AD (68 wt %) were added 3 g of Krytox 143AD and 8 g of zirconium oxide ($ZrO_2$) powder having a primary-particle size of 0.02 μm, and they were mixed and kneaded in an agate mortar at room temperature to produce a pasty material. To the pasty material was added 100 g of $CF_2Cl$—$CFCl_2$, and they were stirred and mixed, and then allowed to stand, after which the supernatant was removed. The slurry-like material that precipitated was repeatedly washed 5 times with 100 g of $CF_2Cl$—$CFCl_2$ with stirring. The resulting powdery material was dried under reduced pressure at 90° C. for 16 hours to produce a $ZrO_2$ particle dispersion composition.

The particle size of the $ZrO_2$ powder used as a starting material which had been measured by the sieving method was as follows; 2000 μm or less: 100%, 1000 μm or less: 99.9%, 710 μm or less: 99.7%, 500 μm or less: 95.3%, 355 μm or less: 62.6%, 250 μm or less: 29.6%, 125 μm or less: 3.3%, and 75 μm or less: 1.0%. On the other hand, the particle size of the $ZrO_2$ particle dispersion composition measured by the sieving method was as follows; 710 μm or less: 100%, 500 μm or less: 99.7%, 355 μm or less: 93.9%, 250 μm or less: 81.8%, 125 μm or less: 30.7%, and 75 μm or less: 7.5%. When the $ZrO_2$ particle dispersion composition obtained was treated with a 1N aqueous sodium hydroxide solution at 90° C. for 16 hours, taken out and then stained with Crystal Violet, it was uniformly stained purple, namely, a homogeneous dispersion of the copolymer and $ZrO_2$ could be confirmed.

Using the solid-particle dispersion composition obtained above, i.e., the solid-particle dispersion composition consisting of the powdery $ZrO_2$ particles and the perfluoro-copolymer containing nonelectrolyte type ($SO_2F$ type) functional groups, a fluorine-containing cation-exchange membrane was produced as follows. With a brush, said solid-particle dispersion composition was applied in an amount of 0.3 mg/cm$^2$ on the surface on the sulfonic acid side (the anode surface) of a substrate membrane (substrate membrane A) composed of a 25-μm thick layer of a carboxylic acid type perfluorocarbon copolymer having an EW value of 1090, a 88-μm thick layer of a sulfonic acid type perfluoro-copolymer having an EW value of 1025, 18-mesh reinforcing cloth made of PTFE yarn of 200 denier by plain weave, and a 38-μm thick layer of a sulfonic acid type perfluoro-copolymer having an EW value of 1025. Then, the coated substrate membrane was placed with the coated surface downward (on paper used at the time of laminating with heating), and the above-mentioned solid-particle dispersion composition was similarly applied on the reverse surface on the carboxylic acid side (the cathode surface of the membrane) in an amount of 0.3 mg/cm$^2$ with a brush at room temperature. In this application of the solid-particle dispersion composition, only the fine powder portion of the powder was adhered to the membrane and the excess powder was removed. The thus treated membrane was subjected to fixation by heating at 220° C. for 2 minutes while reducing the pressure outside (under) the paper, to produce a fluorine-containing cation-exchange membrane containing nonelectrolyte type functional groups.

This membrane was hydrolyzed at 95° C. for 2 hours in an aqueous solution containing 30 wt % of KOH and 5 wt % of dimethyl sulfoxide to convert the functional groups to potassium salt type functional groups. Thereafter, the membrane was equilibrated at 90° C. for 1 hour by the use of a 0.1N aqueous sodium hydroxide solution to convert the potassium salt type functional groups to sodium salt type functional groups. Using the thus obtained membrane as a diaphragm, electrolysis was carried out for 300 hours to find that the current efficiency was 95.5 to 96.5% and the electrolysis voltage was 3.06 to 3.11 V.

Using a membrane produced and then subjected to conversion to sodium salt type functional groups in the same manner as above, the "rate of peeling" of the $ZrO_2$ layer was measured and found to be less than 5% on the cathode surface side of the membrane and 25% on the anode surface side. The $ZrO_2$ particle layer was hardly taken off, namely, it had a strong adhesion to the substrate membrane.

COMPARATIVE EXAMPLE 4

When no coating layer was formed on the same substrate membrane as used in Example 8, the current efficiency was 96.5 to 97.5% and the electrolysis voltage was 3.23 to 3.26 V.

According to a conventional technique, a coating layer was formed on a membrane having the same structure as that of the substrate membrane A described in Example 8, by the use of a dispersion consisting of $ZrO_2$ and a water/ethanol (50/50 by volume) solution containing 10 wt % of a $SO_3H$ type perfluoro-copolymer having an EW value of 950. Using the coated membrane as a diaphragm, electrolysis was carried out for 300 hours to find that the current efficiency was 95.5 to 96.5% and the electrolysis voltage was 3.08 to 3.11 V. Thus, the coated membrane exhibited exactly the same membrane characteristics as attained in Example 8.

Using a membrane produced in the same manner as above and subjected to conversion to sodium salt type functional groups, the "rate of peeling" of the $ZrO_2$ layer was measured and found to be 95% on both the cathode surface side and the anode surface side of the membrane. In treatment with a mixed solution of water and ethanol (50/50 by volume) under reflux in the measurement, an apparent removal of white powder ($ZrO_2$ particles) was visually observed.

EXAMPLE 9

Powder of a $ZrO_2$ particle dispersion composition was produced by the same process as in Example 8 except for using the dispersion composition produced in Example 2, i.e., the dispersion composition consisting of the carboxylic acid type perfluoro-copolymer having an EW value of 1210 and a MI value of 8 (29 wt %) and Krytox 143AD (71 wt %), and the $ZrO_2$ particles described in Example 8.

The particle size of the obtained $ZrO_2$ particle dispersion composition measured by the sieving method was as follows; 710 μm or less: 100%, 500 μm or less: 99.9%, 355 μm or less: 92.8%, 250 μm or less: 82.7%, 125 μm or less: 64.5%, and 75 μm or less: 32.2%. When the obtained $ZrO_2$ particle dispersion composition was treated with a 1N aqueous sodium hydroxide solution at 90° C. for 16 hours, taken out and then stained with Crystal Violet, it was uniformly stained purple, namely, a homogeneous dispersion of the copolymer and $ZrO_2$ could be confirmed.

Using the solid-particle dispersion composition obtained above, i.e., the solid-particle dispersion composition consisting of the $ZrO_2$ particles and the perfluoro-copolymer containing nonelectrolyte type ($CO_2CH_3$ type) functional groups, a fluorine-containing cation-exchange membrane was produced as follows. On a substrate membrane (substrate A) having the same structure as used in Example 8, the $ZrO_2$ particle dispersion composition comprising the sulfonic acid type perfluoro-copolymer was applied on the surface on the sulfonic acid side (the anode surface of the membrane) in the same manner as in Example 8, and the aforesaid $ZrO_2$ particle dispersion composition comprising the $CO_2CH_3$ type perfluoro-copolymer was applied on the reverse surface on the carboxylic acid side (the cathode surface of the membrane) in an amount of 0.3 mg/cm$^2$ with a brush at room temperature. In this case, only the fine powder portion of each powder was adhered to the membrane and the excess powder was removed. The thus treated membrane was subjected to fixation by heating at 220° C. for 2 minutes while reducing the pressure outside (under) the same paper as used in Example 8, to produce a fluorine-containing cation-exchange membrane containing nonelectrolyte type functional groups.

This membrane was subjected to conversion to sodium salt type functional groups in the same manner as in Example 8, after which using the resulting membrane as a diaphragm, electrolysis was carried out for 300 hours to find that the current efficiency was 97.0 to 98.0% and the electrolysis voltage was 3.13 to 3.16 V. Thus, a sufficient reducing effect on the electrolysis voltage was obtained by the prevention of gas adhesion during the electrolysis, and the current efficiency was improved.

Using a membrane produced and then subjected to conversion to sodium salt type functional groups in the same manner as above, the "rate of peeling" of the $ZrO_2$ layer was measured and found to be less than 5% on the cathode surface side of the membrane and 25% on the anode surface side. The $ZrO_2$ particle layer was hardly taken off, namely, it had a strong adhesion to the substrate membrane.

COMPARATIVE EXAMPLE 5

Using the copolymer produced in Comparative Example 2, i.e., the carboxylic acid type perfluoro-copolymer having a completely solid structure formed therein (20 wt %) and the same $ZrO_2$ particles as used in Example 8 (80 wt %), attempts were made to form a coating layer as follows.

(a) An attempt was made to mix the copolymer and the ZrO2 particles by melt kneading at 220° C., but they were very difficult to make into a homogeneous dispersion and moreover, they could not be made into a thin layer of 30 μm or less in thickness.

(b) After mixing 2 g of the carboxylic acid type perfluoro-copolymer, 8 g of the $ZrO_2$ particles and 100 g of $CF_2Cl$—$CFCl_2$, powder was extracted therefrom and dried under reduced pressure at 90° C. for 16 hours. The same substrate film as used in Example 8 was coated with the powder in the same manner as in Example 9. This powder could not be applied on the membrane in a uniform thickness and formed large spots on the membrane surface, resulting in a coating layer that was too thick. The thus obtained fluorine-containing cation-exchange membrane containing nonelectrolyte type functional groups was subjected to conversion to sodium salt type functional groups in the same manner as in Example 8. Using the thus treated membrane as a diaphragm, electrolysis was carried out to find that the electrolysis voltage was more than 3.3 V which was higher than the electrolysis voltage required in the case of the membrane having no coating layer formed thereon. The powder used above as a starting material was treated with a 1N aqueous sodium hydroxide solution at 90° C. for 16 hours and then stained with Crystal Violet to find that it was separated into particles (the copolymer) stained purple, and non-stained white particles ($ZrO_2$).

EXAMPLE 10

A pasty material was obtained by mixing and kneading 10 g of the dispersion composition produced in Example 2, i.e., the dispersion composition consisting of the carboxylic acid type perfluoro-copolymer having an EW value of 1210 and a MI value of 8 (29 wt %) and Krytox 143AD (71 wt %), and 3.1 g of $ZrO_2$ particles having a primary-particle size of 0.02 µm in an agate mortar at room temperature.

The pasty material was press-shaped at 220° C. and 40 MPa to obtain a thin film of 5 µm in thickness. In this case, the excess Krytox 143AD was separated and emerged onto the film surface. Then, the Krytox 143AD was washed away from the film with $CF_2Cl$—$CFCl_2$, after which the film was dried under reduced pressure at 90° C. for 4 hours to obtain a film composed of a homogeneous dispersion of the perfluoro-copolymer having nonelectrolyte-type $CO_2CH_3$-type functional groups and the $ZrO_2$ particles. The above method comprising melt-shaping the pasty material containing the fluoro-oligomer as is suitable for obtaining a very thin film.

EXAMPLE 11

KCl powder was finely ground in an agate mortar and then dried under reduced pressure at 150° C. for 16 hours. The particle size of the KCl powder measured by the sieving method was as follows; 710 µm or less: 100%, 500 µm or less: 99.7%, 355 µm or less: 96.0%, 250 µm or less: 88.5%, 125 µm or less: 60.2%, and 75 µm or less: 23.3%. Three grams of the KCl powder and 15 g of the dispersion composition containing 32 wt % of the sulfonic acid type perfluoro-copolymer as produced in Example 1 were mixed and kneaded in an agate mortar in a dry box while passing dry air through the dry box.

The resulting pasty material was placed in an extraction thimble, after which the extraction thimble was immersed in a beaker containing 100 ml of $CF_2Cl$—$CFCl_2$, and the Krytox 143AD in the extraction thimble was removed with stirring. The above procedure was repeated 5 times while replacing the $CF_2Cl$—$CFCl_2$ outside the extraction thimble with fresh $CF_2Cl$—$CFCl_2$. Thereafter, the slurry-like material in the extraction thimble was taken out and then dried under reduced pressure at 90° C. for 16 hours. The resulting powder was press-shaped at 200° C. and 10 MPa to obtain a film of about 50 µm in thickness. The film was treated with a 1N aqueous potassium hydroxide solution at 90° C. for 16 hours and then washed with water to obtain a porous film. This film was transparent when wetted with water, and became whitely turbid when dried. As a result of observing a section of the porous film under an optical microscope, it was found that the porous film had a larger pore size than did the porous films obtained in Examples 5, 6 and 7.

The powder produced in Comparative Example 1, i.e., the powder of the perfluoro-copolymer having a completely solid structure formed therein and the same KCl powder as used above were mixed and kneaded by the same method as above, and then attempted to be press-shaped at 200° C. In this case, large spots (spots with a diameter of 1 cm or more due to transparent portions and opaque portions) were formed, so that the shaped product was of no practical use.

EXAMPLE 12

After 850 g of $CF_2$=$CF$—$O$—$CF_2CF(CF_3)$—$O$—$CF_2CF_2$—$SO_2F$ was charged into a 1-liter stainless-steel autoclave, the autoclave was purged with nitrogen and then tetrafluoro-ethylene (TFE, $CF_2$=$CF_2$). The temperature was adjusted to 25° C. and the pressure of TFE to 0.637 MPa-G, after which 5 g of a $CF_2Cl$—$CFCl_2$ solution containing 5 wt % of (n-$C_3F_7COO$—)$_2$ was added and the resulting mixture was subjected to polymerization. The polymerization was carried out for 30 minutes while feeding TFE from the outside of the system in the polymerization vessel and keeping the TFE pressure constant at 0.637 MPa-G. After the TFE in the system in the polymerization vessel was replaced with nitrogen to adjust the internal pressure to atmospheric pressure, a polymerization liquid composition was obtained.

To 10 ml of the polymerization liquid composition was added 10 ml of Krytox 143AD (Lot-162) manufactured by E.I. du Pont de Nemours & Co., at room temperature, followed by mixing and stirring. Owing to the mixing and stirring, the polymerization liquid composition became whitely turbid. Subsequently, to the dispersion thus obtained was added 20 ml of a liquid consisting of $CF_2Cl$—$CFC_{12}$ and methanol (50/50 by volume), and they were mixed and stirred, and then allowed to stand to be separated into two layers, i.e., a colorless and transparent upper layer and a whitely turbid lower layer. The whitely turbid lower layer was taken out, repeatedly washed 5 times with 20 ml of a liquid consisting of $CF_2Cl$—$CFCl_2$ and methanol (50/50 by volume) at room temperature, and then dried under reduced pressure at 60° C. for 16 hours to remove low-boiling compounds, whereby 10 ml of a whitely turbid, pasty dispersion composition was obtained.

About 5 g of a whitely turbid dispersion composition was obtained from the polymerization liquid composition in exactly the same manner as above except for using 2.5 ml of Krytox 143AY (Lot-406) in place of the fluoro-oligomer used above. This dispersion was substantially like rubber, was elastic and was somewhat different in properties from the dispersion obtained in Example 1 or 2. In order to obtain a stable dispersion composition from the high-molecular weight compound, a larger amount of the fluoro-oligomer was necessary.

The perfluoro-copolymer contained in the above-mentioned dispersion composition had an EW value of 930 and a MI value of 0.05, as measured by using powder (12 g) obtained by adding 2 liters of a liquid consisting of $CF_2Cl$—$CFCl_2$ and methanol (30/70 by volume) to 600 g of the above-mentioned polymerization liquid composition to precipitate the perfluoro-copolymer, repeatedly washing the precipitate 5 times with a liquid having the same make-up as above, at room temperature, and drying the washed precipitate under reduced pressure at 110° C. for 16 hours.

EXAMPLE 13

On a PTFE sheet of 1 mm in thickness was placed an EPTFE film having a diameter of 11 cm, a thickness of 100 µm, an average pore size of 100 µm, a void content of 81% and a tensile strength of 2.5 kg/mm (Fluoropore Membrane Filter NP-1000, mfd. by Flon Chemical Co. (acetone flow rate 2100 liters/min/cm², air flow rate 50 liters/min/cm², and bubble point 0.04 kg/cm²; here, the term "acetone flow rate" means the number of liters per minute, per cm² of filtration area at 25° C. and a differential pressure of 70 cm of mercury, the term "air flow rate" means the number of liters per minute, per cm² of filtration area at 25° C. and a differential pressure of 70 cm of mercury, and the term "bubble point" means a pressure at which air flows out of a Fluoropore Membrane Filter immersed in alcohol, when introduced into a Fluoropore Membrane Filter)). On the EPTFE film (its center) was applied 1 g of the dispersion composition produced in Example 1, i.e., the dispersion composition consisting of the sulfonic acid type perfluoro-copolymer having an EW value of 955 and a MI value of 22 (32 wt %) and Krytox 143AD (68 wt %). A PTFE sheet of 1 mm in thickness was placed thereon, and the resulting assembly was held between stainless steel plates of 2 mm in thickness, set in a press-shaping machine heated at 260° C., and immediately treated at a pressure of 20 MPa for 2 minutes. After cooling to room temperature at a pressure of 20 Mpa, the EPTFE film was taken out. The central portion (with a diameter of about 6 cm) of this film was transparent, and colorless and transparent Krytox 143AD had flown out onto the surface of this film. The perfluoro-copolymer was hardly observed on the surface of the EPTFE film. The Krytox 143AD was washed away with HFC43-10mee at room temperature, followed by drying under reduced pressure at 60° C. for 1 hour. The central portion of the thus treated EPTFE film was still transparent and the peripheral portion showed the white color of the original PTFE porous film. The thickness of the transparent central portion of said EPTFE film was 45 to 55 µm. The infrared absorption spectrum of this transparent portion was measured to confirm an absorption (1470 cm$^{-1}$) due to a —OCF$_2$CF$_2$SO$_2$F group and an absorption (near 2350 cm$^{-1}$) due to —CF$_2$—.

The obtained film was hydrolyzed at 60° C. for 8 hours in a mixture of a 6N aqueous potassium hydroxide solution and a 50 vol % methanol solution, washed with water at room temperature, air-dried, and then stained with Malachite Green. Only the central portion (with a diameter of about 6 cm) of said film was stained blue. On a section obtained by cutting the central portion, it was confirmed under an optical microscope that voids had been completely filled with the resin stained blue.

COMPARATIVE EXAMPLE 6

Hot pressing at 260° C. (and cold pressing) were carried out in the same manner as in Example 13 except for using a mixture of 0.3 g of the powder of the copolymer of Comparative Example 1 having a completely solid structure formed therein and 0.7 g of Krytox 143AD, in place of 1 g of the dispersion composition. The resulting film was washed with HFC43-10mee at room temperature and then dried under reduced pressure at 60° C. for 1 hour. One side of the thus treated film was still in the same state as that of the white EPTFE film and the reverse side was a flat and lustrous film layer. The treated film was hydrolyzed and then stained in exactly the same manner as in Example 13. The EPTFE film surface was not stained at all and remained white, namely, it was confirmed that the EPTFE film had not been impregnated with the perfluoro-copolymer at all. On a section obtained by cutting the treated film, it was confirmed under an optical microscope that the EPTFE film layer had been crushed to a thickness of about 15 µm and had lost voids, so that this layer was not stained at all. The layer of the perfluoro-copolymer stained in a blue color had a thickness of about 40 µm. Thus, a film having a two-layer structure was merely formed and the voids of the EPTFE film had not been impregnated with the perfluoro-copolymer at all.

EXAMPLE 14

An EPTFE film impregnated with a carboxylic acid type perfluoro-copolymer was obtained by exactly the same process as described in Example 13, except for using the dispersion composition produced in Example 2, i.e., the dispersion composition consisting of the carboxylic acid type perfluoro-copolymer having an EW value of 1210 and a MI value of 8 (29 wt %) and Krytox 143AD (71 wt %), and changing the temperature of the press shaping machine to 270° C. The thickness of the transparent central portion of said film was 60 to 65 µm. The infrared absorption spectrum of this transparent portion was measured to confirm an absorption (1790 cm$^{-1}$) due to the carbonyl of a —CO$_2$CH$_3$ group, an absorption (near 3000 cm$^{-1}$) due to C—H of a —CO$_2$CH$_3$ group and an absorption (near 2350 cm$^{-1}$) due to —CF$_2$—.

This film was hydrolyzed and then stained in the same manner as in Example 13 to confirm that the voids of the EPTFE porous films had been filled with the copolymer.

EXAMPLE 15

To 100 g of a polymerization liquid composition (measured value of the perfluoro-copolymer concentration in the polymerization liquid composition: 5.5 wt %) produced in the same manner as in Example 2 was added 14.28 g of Daifloil #10 manufactured by DAIKIN Industries Ltd. (which was a fluoroolefin telomer having a structure Cl[—CF$_2$—CFCl—]$_x$Cl and an average molecular weight of 900), followed by mixing and stirring. Owing to the mixing and stirring, the polymerization liquid composition became slightly and whitely turbid. From this liquid, low-boiling volatile components were removed in a stream of dry nitrogen while heating the liquid at 30° C. Thus, a colorless, transparent, viscous and pasty material was obtained. Then, this paste was dried under reduced pressure at 90° C. for 6 hours to obtain 14.7 g of a whitely turbid, pasty material.

EXAMPLE 16

A pasty material (a dispersion composition) consisting of 25 wt % of a perfluoro-copolymer containing SO$_2$F type functional groups and having an EW value of 950 and a MI value of 20 and 75 wt % of Krytox 143AD was produced by carrying out the production of a dispersion composition and then the removal of the excess Krytox 143AD in the same manner as in Example 1. Subsequently, the pasty material was sifted through a stainless steel screen with a screen opening of 212 µm to remove foreign matters (large particles) in an amount of about 1 wt %, whereby a pasty material composed of a fine dispersion was obtained.

Using this pasty material, a 3 cm×3 cm film cut out of each of the following EPTFE films different in pore size was impregnated with the perfluoro-copolymer containing SO$_2$F type functional groups and having an EW value of 950: (i) Goa-Tex film (SMO-09010), mfd. by Japan Goa-Tex Inc.; pore size: 0.1 µm, thickness: 35 µm, Gurley No.: about 10 seconds, and void content: 72%, (ii) MEMBRANE FILTER (POLYMER:PTFE,CAT.NO.:TO50A293D), mfd. by ADVANTEC; average pore size: 0.5 µm, thickness: 75 µm, and void content: 80%, (iii) Goa-Tex film (SMO-05100), mfd. by Japan Goa-Tex Inc.; pore size: 1 µm, thickness: 50 µm, Gurley No.: about 1 second, and void content: 85%, (iv) MEMBRANE FILTER (POLYMER:PTFE,CAT.NO.: T300A293D), mfd. by ADVANTEC; average pore size: 3 µm, thickness: 75 µm, and void content: 76.5%, and (v)

Fluoropore Membrane Filter: NP-500, mfd. by Flon Chemical Co. (acetone flow rate 1300 liters/min/cm², air flow rate 30 liters/min/cm², and bubble point 0.09 kg/cm²); average pore size: 50 μm, thickness: 100 μm, and void content: 81%.

At first, two films were individually produced by applying the above-mentioned pasty material in a thin layer and uniformly on one side of a Kapton film in the same amount as a calculated necessary amount. Each of the film test pieces described above was held between the two produced Kapton films so that the pasty material might come into contact with the test piece, whereby air around the film test piece was removed. The resulting assembly was held between stainless steel plates of 2 mm in thickness, set in a press shaping machine heated at 270° C., and immediately treated at a pressure of 10 MPa for 5 minutes. After cold pressing at a pressure of 10 MPa, the film test piece was taken out, washed with HFC43-10mee to remove the fluoro-oligomer, and then dried under reduced pressure at 110° C. for 2 hours. This film test piece was held between the Kapton films, reset in the press shaping machine heated at 270° C., and treated at a pressure of 10 MPa for 5 minutes. Each of the above-mentioned film test pieces (i) to (v) was subjected to the same treatments as above, whereby a transparent (or rather semitransparent than transparent) film having voids completely filled with the perfluoro-copolymer containing $SO_2F$ type functional groups could be obtained from the film test piece having any pore size. In the case of the above-mentioned film test pieces (i) to (iii), spots due to partial white portions and semitransparent portions were formed by the washing with HFC43-10mee after the first impregnation (the test piece was transparent in this step), but the voids could be completely impregnated with the perfluoro-copolymer by the re-hot-pressing.

EXAMPLE 17

A pasty material (a dispersion composition) consisting of 25 wt % of a perfluoro-copolymer containing $CO_2CH_3$ type functional groups and having an EW value of 1190 and a MI value of 8 and 75 wt % of Krytox 143AD was produced by carrying out the production of a dispersion composition and then the removal of the excess Krytox 143AD in the same manner as in Example 2, and foreign matters having a large particle size were removed in the same manner as in Example 16.

Each of the EPTFE films (i) to (v) described in Example 16 was impregnated with the $CO_2CH_3$ type perfluoro-copolymer in the same manner as in Example 16 except for using the pasty material produced above as a starting material. As a result, an impregnated film having voids completely filled with the $CO_2CH_3$ type perfluoro-copolymer could be produced from any of the EPTFE films.

COMPARATIVE EXAMPLE 7

The following treatments (A) and (B) were carried out by using each of the EPTFE films (substrate films) (i) to (v) described in Example 16, powder of a $SO_2F$ type perfluoro-copolymer with an EW value of 955 and a MI value of 20 produced by the same process as in Comparative Example 1 and powder of a $CO_2CH_3$ type perfluoro-copolymer with an EW value of 1195 and a MI value of 16 produced by the same process as in Comparative Example 2: (A) films shaped out of each perfluoro-copolymer by melt pressing and each of the above-mentioned substrate EPTFE films were stuck together, and the resulting assembly was placed with the EPTFE film downward, and then treated at 260° C. for 2 minutes under reduced pressure, and (B) films shaped out of each perfluoro-copolymer by melt pressing and each of the above-mentioned substrate EPTFE films were stuck together and then pressed at 290° C. and a pressure of 10 MPa for 10 minutes. In both treatments, no impregnation with the perfluoro-copolymer took place, and only a film having a two-layer structure composed of the EPTFE porous material and the perfluoro-copolymer was formed. In the above treatment (B), a porous material layer of the EPTFE film was crushed when this film was a weak substrate.

EXAMPLE 18

The same film as the film test piece (iv) (pore size: 3 μm) described in Example 16 was impregnated with a $SO_2F$ type perfluoro-copolymer in the same manner as in Example 16.

The EPTFE film used was an untreated one and had dimensions of 70 mm×70 mm, a thickness of 60 μm, a film weight of 0.1260 g and a void content of 76.5%.

After being impregnated with the $SO_2F$ type perfluoro-copolymer, the EPTEE film had dimensions of 70 mm×70 mm (not changed at all), a thickness of 55 μm (slightly decreased) and a film weight of 0.5169. The content of the $SO_2F$ type perfluoro-copolymer calculated from the values described above was 75.6 wt %. Subsequently, the impregnated film was hydrolyzed at 90° C. for 2 hours in an aqueous solution containing 30 wt % of KOH and 5 wt % of DMSO, thoroughly washed with water, and then treated with 1N hydrochloric acid at 90° C. for 8 hours to convert the functional groups contained in the copolymer to $SO_3H$ type functional groups. In the successive treatments described above, the film was not wrinkled and was hardly changed in dimensions. The thus treated film was air-dried, dried under reduced pressure at 110° C. for 8 hours, and immediately and accurately weighed to obtain a value of 0.5262 g. The content of the $SO_3H$ type perfluoro-copolymer calculated from the values described above was 76.1%. After the drying, the film dimensions were 68 mm×68 mm and the film thickness was 65 μmt. The dried film was held between Kapton films and the resulting assembly was held between stainless steel plates and pressed at 150° C. and 10 MPa for 90 minutes (this treatment was only for imposing the same history as imposed in Comparative Example 8 described hereinafter, and was not necessary in practice). After the thus treated film was treated with water at 60° C. for 30 minutes, its water content at 25° C. was 10.3 wt % based on the dry weight of resin of the perfluoro-copolymer. After this film was further treated with a mixed solution of water and methanol (50/50 by volume) at 60° C. for 30 minutes, thoroughly washed with water, and then treated with water at 60° C. for 30 minutes, its water content at 25° C. was 17.2 wt % based on the dry weight of resin of the perfluoro-copolymer. In the above successive treatments, no weight loss was caused.

The "rate of extraction of the perfluoro-copolymer containing $SO_3H$ type functional groups" measured by the use of the thus treated film was 32 wt %. In the film after the treatments (after drying), a few wrinkles and a slight transparency loss (a change to semi-transparency) were observed, but the perfluoro-copolymer remaining owing to the impregnation therewith was strongly fixed to the EPTFE film used as a substrate, indicating that the film after the treatments had a high structural stability. It could be confirmed that the perfluoro-copolymer resin portion had a structural stability equal to that of a conventional film formed by melt extrusion.

In addition, the above-mentioned film impregnated with the perfluoro-copolymer containing $SO_3H$ type functional groups and composed of a strong molecular chain, from which components having a low EW value and a low molecular weight had been extracted in an amount of 32 wt %, was held between Kapton films, and the resulting assembly was held between stainless steel plates and pressed at 150° C. and 20 MPa for 90 minutes to obtain a transparent film containing the $SO_3H$ type perfluoro-copolymer (about 68%) completely infiltrated thereinto. The film dimensions were 59 mm×52 mm and the film thickness was 69 µmt.

COMPARATIVE EXAMPLE 8

The same EPTFE film as in Example 18 was impregnated with a solution of a perfluoro-copolymer containing $SO_3H$ type functional groups in water/alcohol by a conventional technique. The EPTFE film used was an untreated one and had dimensions of 70 mm×70 mm, a thickness of 60 µm and a void content of 76%.

(1) There was used a mixed solution of water and ethanol (50/50 by volume) containing 5 wt % of a perfluoro-copolymer containing $SO_3H$ type functional groups which had been produced from a perfluoro-copolymer containing $SO_2F$ type functional groups and having an EW value of 950 and a MI value of 20 (hereinafter polymer solution A). Impregnation treatment consisting of the application of polymer solution A on the aforesaid film (measured weight: 0.0935 g) and air-drying was repeated 10 times until a weight increase was not caused. After drying under reduced pressure at 110° C. for 8 hours, the film weight was 0.1515 g and the content of the perfluoro-copolymer containing $SO_3H$ type functional groups was 38 wt %. The dried film had many spots due to white portions not sufficiently impregnated with the perfluoro-copolymer, possessed decreased dimensions of 65 mm×68 mm, and had wrinkles. By only treating this film at 60° C. with a mixed solution of water and ethanol (50/50 by volume), about 10 wt % of the contained perfluoro-copolymer containing $SO_3H$ type functional groups was taken off, namely, the film had a low durability even under mild conditions. It is conjectured that a cause of the low durability is as follows: the film was produced from the polymer solution and moreover, the contained perfluoro-copolymer containing $SO_3H$ type functional groups had a low EW value.

(2) In view of the results obtained in the above item (1), the same treatment as in the above item (1) was carried out except for using a water/alcohol solution containing 5 wt % of a perfluoro-copolymer containing $SO_3H$ type functional groups having a higher EW value of 1100 (mfd. by E.I. du Pont de Nemours & Co.; hereinafter polymer solution B). Impregnation treatment consisting of application of polymer solution B on the aforesaid film (measured weight: 0.1013 g) and air-drying was repeated 10 times until a weight increase was not caused. After drying under reduced pressure at 110° C. for 8 hours, the film weight was 0.2378 g and the content of the perfluoro-copolymer containing $SO_3H$ type functional groups was 57 wt %. Also in this film, spots were observed in places though the degree of their presence was considerably lower than that in the above item (1). The dried film possessed remarkably decreased dimensions of 62 mm×58 mm and had wrinkles. In order to fix and strengthen the structure of the infiltrated perfluoro-copolymer containing $SO_3H$ type functional groups, the dried film was held between Kapton films, and the resulting assembly was held between stainless steel plates and then pressed at 150° C. and 10 MPa for 90 minutes. After the thus treated film was treated with water at 60° C. for 30 minutes, its water content at 25° C. was 8.6 wt % based on the dry weight of resin of the perfluoro-copolymer. After this film was further treated with a mixed solution of water and methanol (50/50 by volume) at 60° C. for 30 minutes, thoroughly washed with water, and then treated with water at 60° C. for 30 minutes, its water content at 25° C. was 15.2 wt % based on the dry weight of resin of the perfluoro-copolymer. It was confirmed that about 3 wt % of the perfluoro-copolymer had been taken off by the successive treatments described above. The "rate of extraction of the perfluoro-copolymer containing $SC_3H$ type functional groups" measured by the use of the thus treated film was 94 wt %. This film had been completely whitened and was in the same state as the original state of the substrate EPTFE film. It was confirmed that the impregnation product produced from polymer solution B was much inferior in structural stability to the impregnation product obtained in Example 18, though the perfluoro-copolymer contained therein had a much higher EW value and hence was difficult to dissolve and extract.

EXAMPLE 19

In the same manner as in Example 18, a film having film dimensions of 10 cm×10 cm was produced by impregnating an EPTFE film having a pore size of 3 µm and a thickness of 60 µmt with a $SO_2F$ type perfluoro-copolymer having an EW value of 950.

The film produced was slit to a width of about 1 mm in the direction of extrusion and then stretched at a ratio of about 5 in contact with a stainless steel plate heated at 300° C. to obtain yarn having an average diameter of about 150 µm (about 350 denier). When the film was stretched at a ratio of 2 to 3, the resulting yarn had no voids newly formed therein. When the film was stretched at a ratio of 5, the resulting yarn had a very small number of voids newly formed therein. However, when each of these yarns was melt-laminated on a film of a perfluoro-copolymer containing $SO_2F$ type functional groups and having an EW value of 950 and its adhesion to this film was confirmed, both yarns exhibited a strong adhesion without any problem and retained this strong adhesion also after the conversion of the functional groups contained therein to Na salt type functional groups.

EXAMPLE 20

Into a 1-liter stainless-steel autoclave were charged 480 g of $CF_2Cl$—$CFCl_2$, 130 g of Krytox 143AD manufactured by E.I. du Pont de Nemours & Co., 280 g of $CF_2$=$CF$—$O$—$CF_2CF(CF_3)$—$O$—$CF_2CF_2$—$SO_2F$ and 0.02 g of methanol as molecular weight regulator, after which the autoclave was purged with nitrogen and then tetrafluoroethylene (TFE, $CF_2$=$CF_2$). After the temperature was adjusted to 25° C. and the pressure of TFE to 0.165 MPa-G (gauge pressure), 7 g of a $CF_2Cl$—$CFCl_2$ solution containing 5 wt % of (n-$C_3F_7COO$—$)_2$ was added and the resulting mixture was subjected to polymerization. The polymerization was carried out for 3.5 hours while feeding TFE intermittently from the outside of the system in the polymerization vessel and reducing the TFE pressure from the initial value of 0.165 MPa-G to a final value of 0.155 MPa-G. After the TFE in the system in the polymerization vessel was replaced with nitrogen to adjust the internal pressure to atmospheric pressure, a polymerization liquid composition was obtained. The polymerization liquid composition had a viscosity of 0.5 g/cm/sec and was a homogeneous jelly-like liquid which had lost its transparency very slightly (namely, which was whitely turbid).

To the polymerization liquid composition was added 1 liter of n-hexane at room temperature, followed by mixing and stirring. The liquid was immediately separated into two layers, and a whitely turbid, pasty material was-precipitated as a lower layer. The pasty material was taken out, repeatedly washed 5 times with 500 milliliters of n-hexane at room temperature, and then dried under reduced pressure at 90° C. for 6 hours to remove low-boiling compounds, whereby 146 g of a whitely turbid, pasty dispersion composition was obtained. A sulfonic acid type perfluoro-copolymer contained in the dispersion composition had an EW value of 935 and a MI value of 36. The content of the perfluoro-copolymer in the pasty dispersion composition was 17 wt %.

Industrial Applicability

The dispersion composition of the present invention is useful as a material for producing a wide variety of fluorine-containing cation-exchange membranes because the perfluoro-copolymer constituting the composition has nonelectrolyte type functional groups capable of permitting melt shaping and is inhibited from forming a completely solid structure therein. The dispersion composition is effective in increasing the adhesive strength between resins constituting the membrane because the perfluoro-copolymer is a non-electrolyte type and hence can be fixed by heating.

The invention claimed is:

1. A process for forming a perfluoro-copolymer layer containing solid particles dispersed therein on a substrate membrane which comprises:
   (i) mixing and kneading 10 to 1000 parts by weight of one or more-kinds of solid particles selected from at least one group among three groups, i.e., a group of alkali-resistant inorganic material particles, a group of electrode powders and a group of sacrificial particles, with a dispersion composition comprising 100 parts by weight of a perfluoro-copolymer having repeating units represented by the following formula 1 and 10 to 10,000 parts by weight of at least one fluoro-oligomer having repeating units shown in the following formula 2 or formula 3, to form a pasty or powdery dispersion composition:

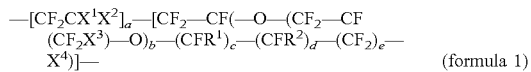
(formula 1)

wherein $X^1$, $X^2$ and $X^3$ are independently F or Cl, a is a real number of 2 to 20, b is an integer of 0 to 2, c is 0 or 1, d and e are independently an integer of 0 to 6, provided that c+d+e is not equal to 0, $R^1$ and $R^2$ are independently F, Cl or a perfluoroalkyl or fluorochloroalkyl group of 1 to 10 carbon atoms, $X^4$ is $CO_2R^3$ or $SO_2F$, and $R^3$ is a hydrocarbon type alkyl group of 1 to 3 carbon atoms;

(formula 2)

wherein Y is F or Cl, and s is a real number of 6 to 10; and

(formula 3)

wherein $R_f^1$ and $R_f^2$ are independently a perfluoroalkylene group of 1 to 4 carbon atoms, and each of q and r is a real number wherein q+r is 6 to 100, (ii) removing the fluoro-oligomer(s) from said dispersion composition by extraction with a fluorine-containing solvent to form a powdery solid-particle dispersion composition containing the perfluoro-copolymer and solid particles as dispersoids, and (iii) fixing said solid-particle dispersion composition on the surface of a substrate membrane by heating at 160° C. to 340° C.

2. A membrane having a perfluoro-copolymer layer containing solid particles dispersed therein which is obtained by a process according to claim 1.

3. A diaphragm for electrolysis, a diaphragm for a fuel cell, or a membrane-electrodes assembly, which comprises a membrane according to claim 2.

4. A process for forming a perfluoro-copolymer layer containing solid particles dispersed therein on a substrate membrane which comprises:
   (i) mixing and kneading 10 to 1000 parts by weight of one or two kinds of solid particles selected from at least one group among three groups, i.e., a group of alkali-resistant inorganic material particles, a group of electrode powders and a group of sacrificial particles, with a dispersion composition comprising 100 parts by weight of a perfluoro-copolymer having repeating units represented by the following formula 4 and 200 to 10,000 parts by weight of at least one fluoro-oligomer having repeating units shown in the following formula 5, formula 6 or formula 7, to form a pasty solid-particle dispersion composition:

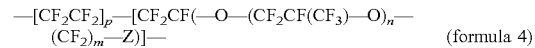
(formula 4)

wherein n is an integer of 0 to 2, m is an integer of 2 to 4, p is a real number of 2 to 20, and Z is $CO_2CH_3$ or $SO_2F$;

(formula 5)

wherein each of q and r is a real number wherein q+r is 6 to 100;

(formula 6)

wherein each of q and r is a real number wherein q+r is 6 to 100; and

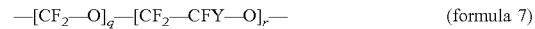
(formula 7)

wherein each of q and r is a real number wherein q+r is 6 to 100, and Y is F or $CF_3$, (ii) applying said solid-particle dispersion composition on the surface of a substrate membrane and heating the composition at 160 to 340° C. to fix the same, and then (iii) washing away the fluoro-oligoether(s) from said film with a fluorine-containing solvent.

5. A process according to claim 4, wherein Z in formula 4 is $CO_2CH_3$, and the substrate membrane is a diaphragm for electrolysis.

6. A diaphragm for electrolysis obtained by a process according to claim 5.

7. A membrane having a perfluoro-copolymer layer containing solid particles dispersed therein which is obtained by a process according to claim 4.

8. A diaphragm for electrolysis, a diaphragm for a fuel cell, or a membrane-electrodes assembly, which comprises a membrane according to claim 7.

* * * * *